(12) United States Patent
Radcliffe et al.

(10) Patent No.: US 11,345,582 B2
(45) Date of Patent: May 31, 2022

(54) FLUID INTEGRATING SYSTEM FOR PRODUCING AN INTEGRATED FLUID ACCORDING TO CONSUMER-DEFINED PREFERENCES

(71) Applicant: ConceptR Partners LLC, Lake Oswego, OR (US)

(72) Inventors: Nathaniel Joel Radcliffe, Lake Oswego, OR (US); Clark Jeffrey Radcliffe, Okemos, MI (US)

(73) Assignee: ConceptR Partners LLC, Lake Oswego, OR (US)

( * ) Notice: Subject to any disclaimer, the term of this patent is extended or adjusted under 35 U.S.C. 154(b) by 82 days.

(21) Appl. No.: 16/756,933

(22) PCT Filed: Jun. 20, 2019

(86) PCT No.: PCT/US2019/038228
§ 371 (c)(1),
(2) Date: Apr. 17, 2020

(87) PCT Pub. No.: WO2020/005707
PCT Pub. Date: Jan. 2, 2020

(65) Prior Publication Data
US 2021/0188612 A1    Jun. 24, 2021

Related U.S. Application Data

(60) Provisional application No. 62/823,878, filed on Mar. 26, 2019, provisional application No. 62/763,619, filed on Jun. 25, 2018.

(51) Int. Cl.
*B67D 1/00*    (2006.01)
*B67D 1/08*    (2006.01)
(Continued)

(52) U.S. Cl.
CPC ......... *B67D 1/0036* (2013.01); *B67D 1/0052* (2013.01); *B67D 1/0888* (2013.01);
(Continued)

(58) Field of Classification Search
CPC .. B67D 1/0036; B67D 1/0052; B67D 1/0888; B67D 1/1222; B67D 2210/0006;
(Continued)

(56) References Cited

U.S. PATENT DOCUMENTS 3,462,083 A    8/1969    Kautz
4,955,507 A    9/1990    Kirschner et al.
(Continued)

FOREIGN PATENT DOCUMENTS

EP    1681969 A1    7/2006
EP    2292126 A1    3/2011
(Continued)

OTHER PUBLICATIONS

International Search Report and Written Opinion of the ISA issued in PCT/US2019/038228, dated Jan. 3, 2020; ISA/EP.
(Continued)

*Primary Examiner* — Vishal Pancholi
*Assistant Examiner* — Robert K Nichols, II
(74) *Attorney, Agent, or Firm* — Harness, Dickey & Pierce, P.L.C.

(57) ABSTRACT

A fluid integrating system (10) includes an integrating manifold (30) having two or more input fluid inlets (132) disposed at oblique angles relative to a center axis of the integrating manifold (30). The two or more input fluid inlets (132) intersect in the integrating manifold (30) to define an integrating chamber (112). The fluid integrating system also includes a pressure sensor (110) fluidly connected to the integrating chamber (112) that is operable to send a pressure signal indicative of the pressure of the fluid in the integrating (Continued)

chamber (112). A integrating controller (22) is operatively coupled to the two or more valves (60) and to the pressure sensor (110) and is operable to selectively control the flow of input fluids into the integrating chamber (112) by actuating the two or more valves (60) based on the pressure signal received from the pressure sensor (110).

19 Claims, 17 Drawing Sheets

(51) Int. Cl.
*B67D 1/12* (2006.01)
*G07F 13/06* (2006.01)

(52) U.S. Cl.
CPC ......... *B67D 1/1222* (2013.01); *G07F 13/065* (2013.01); *B67D 2210/0006* (2013.01)

(58) Field of Classification Search
CPC .... B67D 1/0022; B65D 83/68; B65D 83/682; A47K 5/1217
USPC ........ 222/145.1, 145.3, 145.8, 145.5, 52, 55
See application file for complete search history.

(56) References Cited

U.S. PATENT DOCUMENTS

| | | | |
|---|---|---|---|
| 5,381,926 A | 1/1995 | Credle, Jr. et al. | |
| 5,642,761 A | 7/1997 | Holbrook | |
| 6,883,685 B2 | 4/2005 | Jones et al. | |
| 7,077,290 B2 | 7/2006 | Bethuy et al. | |
| 7,320,414 B2 | 1/2008 | Davis | |
| 7,669,737 B2 | 3/2010 | Bethuy et al. | |
| 7,806,294 B2 * | 10/2010 | Gatipon | B67D 1/1256 222/1 |
| 8,087,544 B2 | 1/2012 | Elsom et al. | |
| 8,485,393 B2 | 7/2013 | Van Zeeland | |
| 9,016,523 B2 | 4/2015 | Gates | |
| 9,056,759 B2 | 6/2015 | Hourmand et al. | |
| 9,725,844 B2 | 8/2017 | Livingston et al. | |
| 2015/0212661 A1 | 7/2015 | Robberechts et al. | |
| 2015/0374164 A1 | 12/2015 | Suzuki et al. | |
| 2016/0318747 A1 * | 11/2016 | Peirsman | B67D 1/1477 |
| 2017/0088410 A1 | 3/2017 | Wing et al. | |
| 2018/0127259 A1 * | 5/2018 | Wiseberg | A47J 31/41 |
| 2018/0362318 A1 | 12/2018 | Rasmussen et al. | |

FOREIGN PATENT DOCUMENTS

| | | |
|---|---|---|
| EP | 2889263 A1 | 7/2015 |
| JP | 2002145396 A | 5/2002 |
| WO | WO-0112039 A2 | 2/2001 |
| WO | WO-2011084062 A1 | 7/2011 |
| WO | WO-2012045860 A1 | 4/2012 |
| WO | WO-2016200852 A1 | 12/2016 |

OTHER PUBLICATIONS

Kavlico Pressure Sensors, "Commercial Application Beverage Dispensing" product flyer, circa. 2015.

* cited by examiner

| STOCK | BLEND% | HOP-IBU | ABV | MALT | SWEET | BODY | MOUTH | INTEGRATION FORMULATOR | HOP-IBU | ABV | MALT | SWEET | BODY | MOUTH |
|---|---|---|---|---|---|---|---|---|---|---|---|---|---|---|
| 50 TRIAL IPA | 16% | 8 | 8 | 2 | 5 | 6 | 8 | CUSTOM TARGET PROPERTYSET (CUSTOM TARGET radar) | 5 | 6 | 7 ←48 | 6 | 3 | 5 |
| 52 TRIAL AMBER | 78% | 3 | 6 | 7 | 7 | 3 | 5 | CUSTOM/ACTUAL (radar) | 3.8 | 6.3 | 6.2 | 6.7 ←58 | 3.5 | 5.3 |
| 54 TRIAL STOUT | 5% | 3 | 5 | 7 | 8 | 4 | 2 | | 1.18 | 0.27 | 0.83 | 0.72 | 0.55 | 0.33 |
| 56 TRIAL PILSNER | 0% | 3 | 1 | 3 | 6 | 2 | 3 | MATCH FACTOR | | | | 97% | | |
| | | | | | | | | | | | | 3.1 | | |

FIG. 3

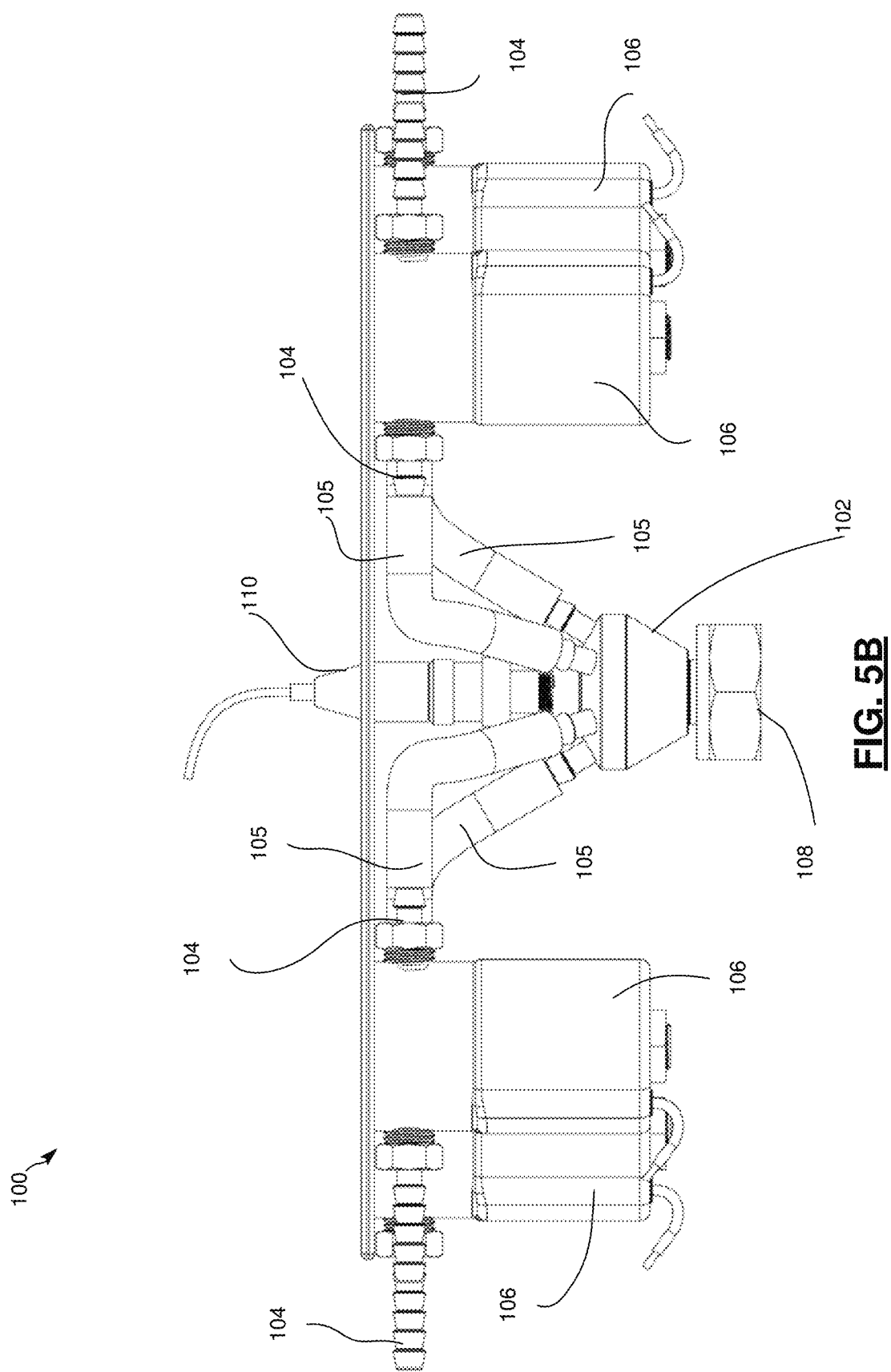

FLUID INTEGRATING SYSTEM FOR PRODUCING AN INTEGRATED FLUID ACCORDING TO CONSUMER-DEFINED PREFERENCES

CROSS-REFERENCE TO RELATED APPLICATIONS

This application is a 371 U.S. National Phase of International Application No. PCT/US2019/038228, filed on Jun. 20, 2019, which claims the benefit of U.S. Provisional Patent Application No. 62/823,878, filed on Mar. 26, 2019, and U.S. Provisional Patent Application No. 62/763,619, filed on Jun. 25, 2018. The entire disclosures of the above applications are incorporated herein by reference

FIELD

The present disclosure relates to a fluid integrating system for producing an integrated or target fluid having characteristics according to specific consumer-defined preferences. A fluid integrating system can sequence a series of discrete fluid pulses that minimize mixing, turbulence, velocity changes or pressure variation until the integrated fluid exits the integrating system.

BACKGROUND

This section provides background information related to the present disclosure which is not necessarily prior art.

Consumers desire beverages, oils, perfumes, lotions and other fluids with taste, scent, color, and other sensory, chemical and physical properties that match their preferences. Existing consumer channels for such fluids offer consumers an array of pre-formulated fluids with various characteristics. Such pre-formulated fluids, however, may not have the characteristics desired by consumers. There exists a need, therefore, for a device that produces an integrated fluid according to consumer-defined preferences.

Example industries where such a need exists include the beverage, cosmetics, confectionery, and consumer products industries. With a near infinite set of sensory combinations perceptible by the human body, retailers offer a multitude of pre-formulated solutions to the consumer. In the beverage industry, this may be quantified by the number of unique bottles in a cooler, cellar or bar, or the number of unique taps. In the cosmetics industry, this may be quantified by the number of unique stock keeping units (SKUs) for a given category of fragrance, lotion, cream, paste, makeup, or hair product. While a large, unique product inventory provides the consumer with many options, it is often a challenge for the consumer to communicate their specific desires and to navigate the inventory to find the best product for them. Secondly, a large inventory presents management and logistics challenges for the retailer. These disadvantages create a need in the marketplace.

The foregoing is provided for the purpose of generally presenting the context of the disclosure. Work of the presently named inventors, to the extent it is described in this section, as well as other aspects that may not otherwise qualify as prior art at the time of filing, are neither expressly nor impliedly admitted as prior art against the present disclosure.

SUMMARY

This section provides a general summary of the disclosure, and is not a comprehensive disclosure of its full scope or all of its features.

The present disclosure provides a system, including apparatus and method, for producing a target fluid having characteristics according to specific consumer-defined preferences. The system can operate by combining, through an integrating process, multiple input fluids at varying volumetric percentages according to an optimization procedure for producing a resultant integrated output fluid or target fluid possessing characteristics closely matching the consumer-defined preferences.

In one aspect of the present disclosure, a fluid integrating system for producing a target fluid having characteristics according to specific user-defined preferences, the fluid integrating system includes an integrating assembly including a plurality of fluid lines, a plurality of valves, and a manifold, the manifold including (i) a body having a plurality of input fluid inlets, the fluid inlets disposed at respective angles relative to a vertical axis extending through a centerline of the manifold and the fluid inlets extending into the body and intersecting to define an integrating chamber within the body of the manifold, and (ii) a pressure channel in fluid communication with the integrating chamber; and an integrating controller configured to (i) receive a custom integration profile and (ii) selectively control flows of a plurality of fluids through respective ones of the plurality of fluid lines and the plurality of valves into the integrating chamber of the manifold to dispense the target fluid based on the custom integration profile, wherein dispensing the target fluid includes dispensing an integrated fluid stream having discrete longitudinal flows of the plurality of fluids.

One category of fluids can include alcoholic beverages. For example, the target fluid can include at least one alcoholic beverage, such as beer or cider, and can have an alcohol content by volume between 2 and 15 percent. Also, the target fluid can include two or more different carbonated fluids.

In still other aspects of the present disclosure, the discrete longitudinal flows can be substantially unmixed in the integrated fluid stream and fluids from the plurality of fluid lines can flow via a single dispenser. Two or more of the plurality of fluid lines, the input fluid inlets, the manifold, and the pressure channel can have a same inner diameter.

In still other aspects of the present disclosure, the integrating assembly can further include a pressure channel in fluid communication with the integrating chamber and at least one of (i) a pressure sensor in fluid communication with the pressure channel and (ii) a fluid flow sensor in fluid communication with each of the fluid lines.

In still other aspects of the present disclosure, the integrating controller can be configured to open and close each of the plurality of valves in accordance with at least one of time modulation control and pulse width modulation control. Further, the integrating controller can be configured to open and close each of the plurality of valves sequentially.

In yet another aspect of the present disclosure, the fluid integrating system can include a user input device configured to receive the user-defined preferences; and an integration formulator in communication with the integrating controller and configured to calculate the custom integration profile of the target fluid based on the user-defined preferences.

In another aspect of the present disclosure, the fluid integrating system can include a computing device configured to execute software to capture the user-defined preferences for the target fluid and convert the user-defined preferences to the custom integration profile. In addition, the computing device can include a conversational translator configured to accept spoken-language user inputs descriptive of the user-defined preferences. The conversational translator can be configured to convert the spoken-language user inputs to a quantitative property set for the target fluid.

In still other aspects of the present disclosure, the fluid integrating system can also include an integration formulator configured to calculate a target property set for the target fluid based on the user-defined preferences, the target property set including one or more parameters describing the characteristics of the target fluid, and calculate the custom integration profile of the target fluid based on the target property set. The target property set can correspond to a normalized property set of the user-defined preferences.

In another aspect of the present disclosure, a fluid integrating system for producing a target fluid having characteristics according to specific user-defined preferences can include (a) an integrating assembly; (b) an integrating controller operatively coupled to the integrating assembly via a computer network; (c) an integration formulator in communication with the integrating controller; and (d) a user input device in communication with the integration formulator and the integrating controller; the integrating assembly can include a plurality of fluid lines; a plurality of valves; a manifold comprising: a body having a plurality of input fluid inlets, the fluid inlets disposed at respective angles relative to a vertical axis extending through a centerline of the manifold and the fluid inlets extending into the body and intersecting to define an integrating chamber within the body of the manifold, and a pressure channel in fluid communication with the integrating chamber; and at least one of a pressure sensor in fluid communication with the pressure channel and a fluid flow sensor in fluid communication with each of the fluid lines; the integrating controller in communication with the at least one of the pressure sensor and the fluid flow sensor and configured to determine at least one of a sensed pressure in the manifold and a sensed fluid flow rate in each of the plurality of fluid lines, and individually control the opening and closing of each of the plurality of valves; the user input device comprising a computing device configured to execute software to capture the user-defined preferences for the target fluid and convert the user-defined preferences to a characteristic profile indicative of the user-defined preferences for the target fluid; and the integration formulator configured to receive the characteristic profile indicative of the user-defined preferences from the user input device, calculate a target property set for the target fluid based on the user-defined preferences, the target property set including one or more parameters describing the characteristics of the target fluid, and calculate a custom integration profile of the target fluid based on the target property set, the integrating controller configured to control the opening and closing of each of the plurality of valves based on the custom integration profile.

In yet another aspect of the present disclosure, a method for producing a target fluid having characteristics according to specific user-defined preferences, the method includes receiving, at a user input device, user inputs including user-defined preferences for the target fluid; using a computing device, converting the user-defined preferences received at the user input device to a characteristic profile, calculating a target property set for the target fluid based on the user-defined preferences contained in the characteristic profile, the target property set including one or more parameters describing the characteristics of the target fluid, and calculating a custom integration profile of the target fluid based on the target property set; and individually controlling the opening and closing of each of a plurality of valves of an integrating assembly including (i) a plurality of fluid lines, (ii) a plurality of valves, and (iii) a manifold comprising a body having a plurality of input fluid inlets, the fluid inlets disposed at oblique angles relative to a vertical axis extending through a centerline of the manifold and the fluid inlets extending into the body and intersecting to define a integrating chamber within the body of the manifold, wherein individually controlling the opening and closing of each of the plurality of valves includes determining a sensed pressure in the manifold and a sensed fluid flow rate in each of the plurality of fluid lines and individually controlling the opening and the closing of each of the plurality of valves based on at least one of the sensed pressure, the sensed fluid flow rates, and the custom integration profile as determined by the computing device.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings. The drawings described herein are for illustrative purposes only of selected embodiments and not all possible implementations, and are not intended to limit the scope of the present disclosure.

FIG. 3 is an illustration of certain aspects of the integrating controller showing exemplary radar plots, an exemplary target property set and an exemplary custom integration profile of the fluid integrating system of the present disclosure;

FIGS. 5A-5C show another exemplary integrating assembly of the present disclosure; FIG. 5A is a perspective view showing the integrating assembly; FIG. 5B is a front elevational view of the integrating assembly; and FIG. 5C is a plan view showing the fluid output side of the integrating assembly;

In the drawings, reference numbers may be reused to identify similar and/or identical elements.

DETAILED DESCRIPTION

Example embodiments will now be described more fully with reference to the accompanying drawings.

The principles and teachings of the present disclosure describe a fluid integrating system that can be used at or near a point of sale to produce an integrated fluid having characteristics that meet consumer-defined preferences (i.e., a target fluid). The fluid integrating system of the present disclosure can be used in connection with various industries and with various integrated fluids. Such industries and integrated fluids can include beverages, cosmetics, perfumes, confections, oils, lubricants, cannabis products, tobacco products, concentrates, fuels, pharmaceuticals, adhesives, concrete, and the like.

An integrated fluid stream means a fluid stream composed of discrete, adjacent, longitudinal component sections of the stream, each of which are substantially unmixed with adjacent component sections of the stream. The generation of such an integrated, unmixed, stream is useful for dispensing a fluid of combined components that do not respond well to turbulent mixing and/or sudden pressure changes when combined. A specific example is the mixing of beer or alcoholic ciders. It is well known in the beer industry, that a beer keg-to-tap (kegerator) system generates a persistent foam when beer is subjected to sudden temperature, pressure or velocity changes when dispensed. This foam is undesirable to consumers. The keg-to-tap "kegerator balancing" design process seeks to remove all sudden pressure, temperature and flow rate changes to keep $CO_2$ dissolved in the beverage as it flows from the keg to the beer tap thereby preventing or reducing bubbly, foamy, beer as dispensed. "Kegerator balancing" provides fluid flow through tubing whose length and diameter is designed provide a continuous, rate-limited, reduction in pressure on the beverage flow stream that results in an almost zero pressure change at the tap valve when the beer flows through the beer kegerator dispensing system.

In one example application of the principles and teachings of the present disclosure, the fluid integrating system can be used to integrate beverages or carbonated fluids, such as beer, alcoholic cider, wine or other beverages, to produce an integrated beverage having characteristics that meet a particular set of consumer-defined preferences. The fluid integrating system can be used to integrate like input fluids that can be stand-alone beverages such as different types of beer, alcoholic cider, wine or other beverages in contrast to combining ingredients to produce a finished beverage.

Figure 1:
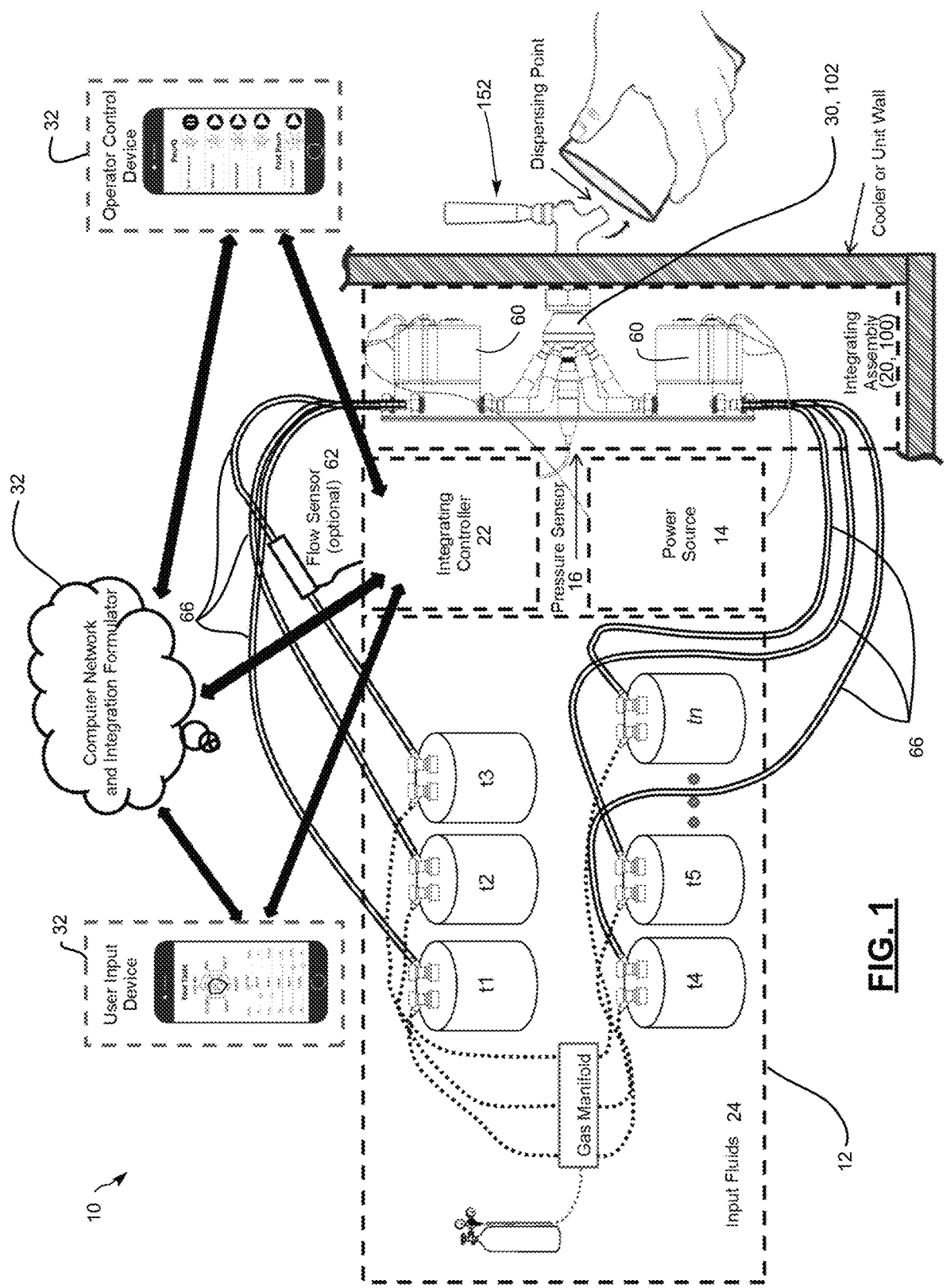
FIG. 1 is a schematic illustration of an exemplary fluid integrating system in accordance with the present disclosure.

FIG. 1 shows an example fluid integrating system 10. The fluid integrating system 10 can include a fluid input source 12, an integrating assembly 20, 100, a power source 14, a pressure sensor 16, 110 and an integrating controller 22. Input fluids 24 can be supplied, for example, under pressure from storage tanks t1, t2 . . . tn through input fluid lines 66 to the integrating assembly 20, 100. The integrating controller 22 can be operatively coupled to the integrating assembly 20, 100 using wired or wireless connections to integrate input fluids 24 in an integrating manifold 30, 102. The integrating controller 22 can also be in communication with one or more computing devices 32, for example a cloud computing system, a desk top computer, a laptop, a tablet or a smartphone. The integrating controller 22 can be operatively coupled to the computing devices 32, using wired or wireless connections including wireless personal area networks (WPANs) or local area networks (LANs), for example.

A consumer can interact with the fluid integrating system 10 using one of the aforementioned computing devices. The consumer can use an application or other software on a computing device to input his or her consumer-defined preferences. In the context of beer, the consumer-defined preferences can be communicated with numerical values, descriptive adjectives, bar graphs, radar plots or similar plots of two or more measured or subjectively-assessed parameters. For example, beer companies commonly quantify alcohol percentage as alcohol by volume or ABV. International Bitterness Unit or IBU is also used to quantify the bitterness of a beer. These example consumer-defined preferences can be input using the application or other software on a computing device.

Figure 2:
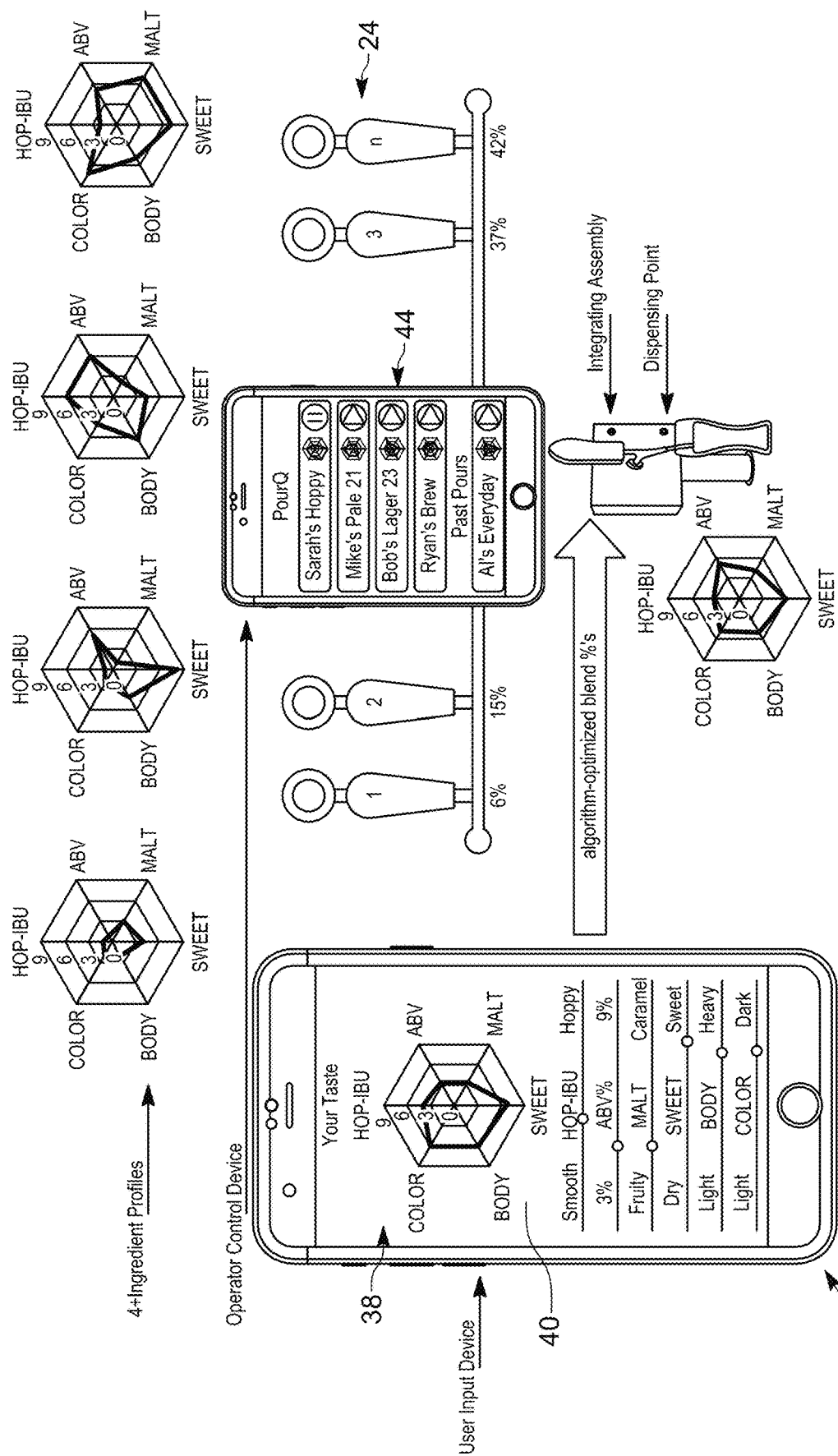
FIG. 2 is an illustration of an exemplary consumer-facing graphical user interface and other aspects of the fluid integrating system.

As shown in the example of FIG. 2, a flavor profile of a beer is defined using six or more (or less) different characteristics. A graphical user interface 40 can display the characteristics. The characteristics may include: HOP-IBU, Alcohol %, Flavor-Malt, Dry-Sweet, Body and Color. The consumer-facing application or other software presents the graphical user interface 40 that includes a radar plot 38 that dynamically changes according to the consumer's inputs and can include slider controls that correspond to each of the beer characteristics. Through the graphical user interface 40, the consumer can input his or her consumer-defined preferences for a flavor profile.

In other examples, the consumer-facing application can include other interfaces to capture a consumer's preferences for the integrated fluid. For example, the consumer-facing application or other software may capture a text phrase or a phrase spoken by the consumer regarding one or more characteristics of a flavor profile. As an alternative to using direct numeric quantification of a desired sensory property set, another method may utilize a phrase to directionally scale a desired and quantified property. A series of these relationships can create a sentence that describes the consumer's target in a near conversational manner. In an example related to beer, the consumer-facing application may capture the phrase, "I'm feelin' like a DARK ALE that is NOT HOPPY and/or is A LITTLE MALTY." This sentence can be translated to numerical quantities that can be used to define a desired flavor profile.

The consumer-facing application can include, for example, a conversational translator that can include a module that translates text or phrases to numeric quantities for each of the one or more characteristics for a flavor profile. The conversational translator module can search or parse the text or phrase for elements that describe characteristics of the flavor profile. For example, in the phrase, "I'm feelin' like a DARK ALE that is NOT HOPPY and/or is A LITTLE MALTY" the conversational translator can isolate the elements "DARK ALE", "NOT HOPPY", and "A LITTLE MALTY" as elements that describe characteristics of beer. The translator, for example, can access dictionaries, tables or other information to determine which elements should be isolated from an input line of text or phrase.

After the descriptive elements are isolated, the translator can access data that matches the isolated elements with a numeric quantity or an indexing coefficient for one or more of the characteristics of a flavor profile. The isolated elements may be categorized into one or more categories that have differing effects on the quantification of the flavor profile. The elements, for example, may be categorized into types, modifiers and indexing coefficients. Types are elements that describe a known flavor profile (or other characteristic profile) of the fluid. Modifiers are elements that can change the one or more individual characteristics of the flavor profile from that of the known type. Indexing coefficients are elements that can alter the extent or amount of change of the modifiers. The isolated types, modifiers and indexing coefficients can be used to calculate or identify a flavor profile that corresponds to the input text or input phrase.

Referring back to the example above, the translator isolated the elements "DARK ALE", "NOT HOPPY", and "A LITTLE MALTY." The translator can identify that the element "DARK ALE" is a type. The translator can access a look-up table or other data to determine the proper categorization of the element. The translator can similarly identify the element "NOT HOPPY" as both an indexing coefficient and a modifier. The word "NOT" indexes the descriptor "HOPPY." Similarly, the translator can identify the element "A LITTLE MALTY" as both an indexing coefficient and a modifier. The phrase "A LITTLE" indexes the descriptor "MALTY."

The translator can then calculate and/or identify a flavor profile that corresponds to the input text or phrase. The translator can begin with the identified type. The translator can then modify the flavor profile associated with the identified type by changing the relevant characteristics in the flavor profile as indicated by the modifiers and/or accompanying indexing coefficients. In the example above, the translator can begin with the identified type "DARK ALE." From experimental results, observation or historical data, the flavor profile of a DARK ALE is known. As such, the type DARK ALE can be characterized by one or more characteristics such as HOP-IBU, Alcohol %, Flavor-Malt, Dry-Sweet, Body, Color or similar measured or subjective qualities of a fluid. These characteristics may include but are not limited to dry, wet, rich, dairy, mouth feel, nutty, seed, herb, cold, floral, spiced, sour, acidic, fruity, wet, roasted, earthy, astringent, marine, mineral, gamey, woody, piney, bitter, meaty, or smoked. Each of these characteristics for the DARK ALE is a known numeric quantity or array of coefficients.

The known numeric quantity for each characteristic of a DARK ALE can then be changed by the translator in accordance with the identified modifiers and/or indexing coefficients. So, in this example, the input phrase included the element "NOT HOPPY." Thus, the translator can directionally reduce the HOP-IBU characteristic of the flavor profile. For example, the translator can associate a numeric quantity with each modifier and another numeric coefficient with each indexing coefficient. In this example, the modifier "HOPPY" can be assigned a numeric quantity of 3 and the indexing coefficient "NOT" can be assigned a numeric coefficient of −1. The translator can change the relevant characteristic of a flavor profile by adding the product of the modifier and the indexing coefficient to such quantified characteristic. Thus, in this example, the HOP-IBU characteristic would be reduced by 3 when the translator identifies the element "NOT HOPPY" in the input text or phrase.

A similar process can be completed for each modifier and/or indexing coefficient that is identified in the input text or phrase. In the example above, the flavor profile of the type "DARK ALE" would be changed by the translator to account for the element "NOT HOPPY" and the element "A LITTLE MALTY." The translator would decrease the HOP-IBU characteristic by 3 (since NOT HOPPY=(−1)*(3)) and increase the Flavor-Malt characteristic by 1 (since A LITTLE MALTY=(0.33)*(3)).

Regardless of how the flavor profile is determined and/or input by a consumer, the personal computing device 42 can communicate with the fluid integrating system 10 to produce an integrated beer that has a flavor profile that is optimized to meet the consumer-defined preferences. In the example shown, the input fluids 24 that are integrated by the integrating assembly 20 are four unique beers having specific individual flavor profiles. The fluid integrating system 10 can determine an optimized integration of the four unique beers to result in an integrated beer that is optimized to meet the consumer-defined preferences. The fluid integrating system 10 can determine a volumetric percentage of each of the four beers that produces the optimized flavor profile. In the example shown in FIG. 2, the fluid integrating system 10 has determined that the integrated beer that produces a flavor profile that closely matches the consumer-defined preferences is an integrated fluid of 6% of the first beer, 15% of the second beer, 37% of the third beer and 42% of the fourth beer by volume.

One or more elements of the integrating assembly 20 can be contained in a smart tap in which the integrated beer can be produced and dispensed for the consumer. The fluid integrating system 10 can also include a bartender application or software that can include a bartender graphical user interface 44. The bartender at a restaurant or bar can control the smart tap and/or the integrating assembly 20 through the bartender graphical user interface 44 in order to dispense the integrated beers (that have been ordered and customized by consumers) in a desired order.

Referring to FIG. 3, the fluid integrating system 10 can include an integration formulator module 26. The integration formulator module 26 can be part of the integrating controller 22 and/or can reside as part of a remote computing device (e.g., server, computer, laptop, smartphone, tablet, etc.) separate from the integrating controller 22. In instances where the integration formulator module 26 resides remote from the integrating controller 22 or elements thereof, the integrating controller 22 can be in communication with the integration formulator module 26 using wired or wireless communications as previously described.

The integration formulator module 26 can receive a set of consumer-defined preferences for a flavor profile. The integration formulator module 26 can then optimize an integrated fluid based on known characteristics of each of the input fluids 24 to result in a flavor profile of an integrated fluid that closely matches the consumer-defined preferences. As shown in FIG. 3, the integration formulator module 26, in one example, can use linear optimization to create a volumetric formulation of the integrated fluid. As further shown, the integration formulator module 26 can receive or determine a target property set 48 that correspond to the consumer-defined preferences. The target property set 48 can be received from the consumer via the consumer-facing application or via other input methods. The integration formulator module can then use linear or other optimization routines to determine a volumetric integration of the each of the input fluids 24 that results in a flavor profile that matches (as closely as possible) the target property set 48.

In this example, the input fluids 24 include Trial IPA 50, Trial Amber 52, Trial Stout 54 and Trial Pilsner 56. Each of these input fluids 24 has a known flavor profile for each of the six characteristics included in this example: Hop-IBU, ABV, Malt, Sweet, Body, and Color. The integration formulator module 26 determines a custom integration profile 58 that minimizes the difference between custom integration profile 58 and the target property set 48 in each of the six characteristics. The integration formulator module 26 can determine the custom integration profile using linear optimization based on the volumetric percentage of each input fluid 24. Any suitable optimization algorithm or solver can be used. For example, the GLOP linear optimization solver available through Google's OR-tools can be used to determine the custom integration profile. In other examples, other algorithms, solvers or tools can be used including non-linear, logarithmic, exponential, or other well-known optimization routines.

While the integration formulator module uses linear optimization in this example, the integration formulator module may use other known algorithms or other known methods to determine a custom integration profile 58. For example, the integration formulator module may access a look-up table that includes various custom integration profiles 58 and then compare the target property set 48 to the custom integration profiles 58 in the look-up table. In still other examples, the integration formulator module may access a database that includes historical data and/or customer preference data to determine a target property set 48 that is anticipated or predicted to satisfy a custom integration profile 58 that is input by a consumer.

The integration formulator module 26 can also determine a match factor or match score that corresponds to the degree to which the custom integration profile 58 aligns with the target property set 48. In the example shown on FIG. 3, the match factor is expressed as a percentage to which the custom integration profile 58 matches the target property set 48. The match factor can be calculated by using the following formula:

$$MF = 100\% - \frac{\left(\sqrt{x_1^2 + x_2^2 + \cdots + x_n^2}\right)}{x_{max} * n}$$

where: MF is the match factor;
$x_n$ is the difference between a custom integration profile characteristic value and a corresponding target property set value for the nth fluid characteristic;
$x_{max}$ is the maximum possible difference between a custom integration profile characteristic value and a corresponding target property set value; and
n is the number of fluid characteristics in a flavor profile.

In the example shown in FIG. 3, the match factor is 97%. The maximum possible difference between a custom integration profile characteristic value and a corresponding target property set in the example is 9 since each characteristic's value can vary between 0 and 9. A match factor of 100% represents that a custom integration profile 58 matches the target property set 48. As the match factor decreases from 100%, the custom integration profile 58 has a greater variation from the target property set 48. The integration formulator module 26 may compare the match factor to a predetermined error level before proceeding to use the custom integration profile 58 to generate an integrated fluid. For example, the predetermined error level can be set to 80%. At this predetermined error level, the integration formulator module 26 can deliver an error indicator to the consumer and/or to a bartender that communicates that the custom integration profile 58 differs from the target property set 48 such that the integrated fluid may be unsatisfactory to the consumer. Such an error indicator, for example, can be delivered to a consumer or to the bartender via the consumer-facing application or the bartender application or via other suitable user interface.

The predetermined error level can be set at any suitable level for a given type of integrated fluid. In the context of integrating beer, the predetermined error level can be set at 80%. In another example, the predetermined error level can be set at 75%. In still other examples, the predetermined error level can be set at a level that is correlated to historical feedback provided by consumers and/or bartenders of the fluid integrating system 10.

After the custom integration profile 58 has been determined, the integrating controller 22 can communicate with the integrating assembly 20 to integrate the input fluids 24 to produce the integrated fluid. Referring back to FIG. 1, the integrating controller 22 can be operatively coupled to one or more solenoid valves 60 and to one or more flow sensors 62. In the example shown, each of the input fluid tanks t1 to tn are fluidly connected to the integrating manifold 30. One flow sensor 62 and one solenoid valve 60 can be fluidly connected between the input fluid tank t1 to tn and the integrating manifold 30. The flow sensor 62 can be any suitable flow sensor such as a turbine flow meter, a paddle wheel flow meter, spring and piston flow meter, ultrasonic flow meters and the like. The solenoid valve 60 can be any suitable solenoid valve. The solenoid valve 60 can include any suitable internal mechanism to control the flow of fluid through the valve. The valve can be, for example, a globe valve, diaphragm valve, pinch valve, ball valve, butterfly valve, plug valve or the like.

The integrating controller 22 can transmit a signal to the solenoid valves 60 to cause the solenoid valves 60 to open and to permit a respective input fluid 24 to flow into the integrating manifold 30. The integrating controller 22 can also receive a signal from the pressure sensor 16 and/or optional flow sensors 62 that can be used to determine the flow of the input fluid 24 into the integrating manifold 30. Thus, the integrating controller 22 can cause the input fluids 24 to flow into the integrating manifold 30 in the correct relative volumetric quantities to produce an integrated fluid having the custom integration profile 58.

Figure 4:
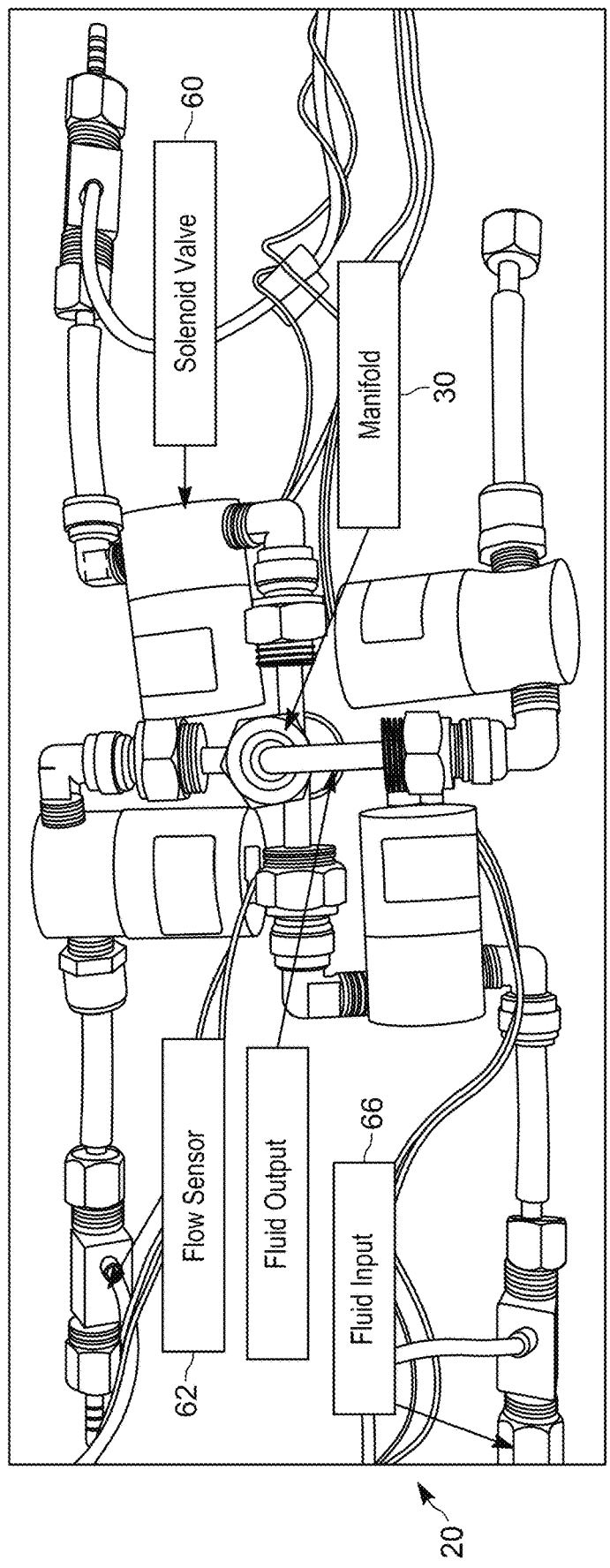
FIG. 4 shows an exemplary integrating assembly of the present disclosure.

Referring now to FIG. 4, one example integrating assembly 20 is shown. In this example, the integrating manifold 30 has a T or a Cross-shape and the four input fluids 24 enter the integrating manifold 30 at right angles to one another. The fluid input lines 66 guide the input fluids 24 from the input fluid tanks t1 to tn (not shown) through the flow sensors 62 and through the solenoid valves 60 before entering the integrating manifold 30. The integrating manifold 30 can be connected to a mount and/or a dispenser (FIG. 1). The integrated fluid can be dispensed to a consumer through the dispenser after it is integrated in the integrating manifold 30.

While not shown, the integrating assembly 20 can also include a digital button, switch, tilt, valve or other sensor on or near the dispenser that can serve as a master on/off switch for the system. When such switch is on and the dispenser is open, the valve 60 of each fluid input line 66 is signaled to open and close by the integrating controller 22 in a modulated manner proportional to the integration percentages as a function of measured flow volume and time that are prescribed by the custom integration profile 58. The integrating controller 22 can include a flow control module that uses determined algorithms to produce the integrated fluid and transmits a signal that modulates the opening of the valves 60 accordingly. The integrating controller 22, for example, can use pulse width modulation to cause the open/closed pulsing of each valve to provide the desired integration independent of dispensed volume. As such, an integrated beer in accordance with a custom integration profile 58 can be dispensed in a pint glass, growler, pitcher or any other desired volume.

The integrating assembly 20 can have other configurations and/or have other quantities of input fluids 24. The various properties of various fluids may result in variations to the configuration depicted in FIGS. 1 and 4. For example, the viscosity, density, temperature and/or pressure at which a fluid is dispensed may impact the structure and/or configuration of the integrating assembly 20.

A second example integrating assembly 100 is illustrated in FIGS. 5-11. The integrating assembly 100 has been found to be particularly successfully in the integrating and dispensing of beer. In this example, the integrating assembly 100 includes an integrating manifold 102, a plurality of input fluid lines 66, a plurality of solenoid-operated valves 106 each including an inlet side and an outlet side barb connector 104, a plurality of secondary fluid lines 105, an integrating fluid output connector 108, and a pressure sensor 110. Many of the elements of the integrating assembly 100 are similar to the elements previously described with respect to the integrating assembly 20 and such descriptions are not repeated for brevity. The integrating manifold 102, however, has a different structure than that previously described.

Figure 5A:
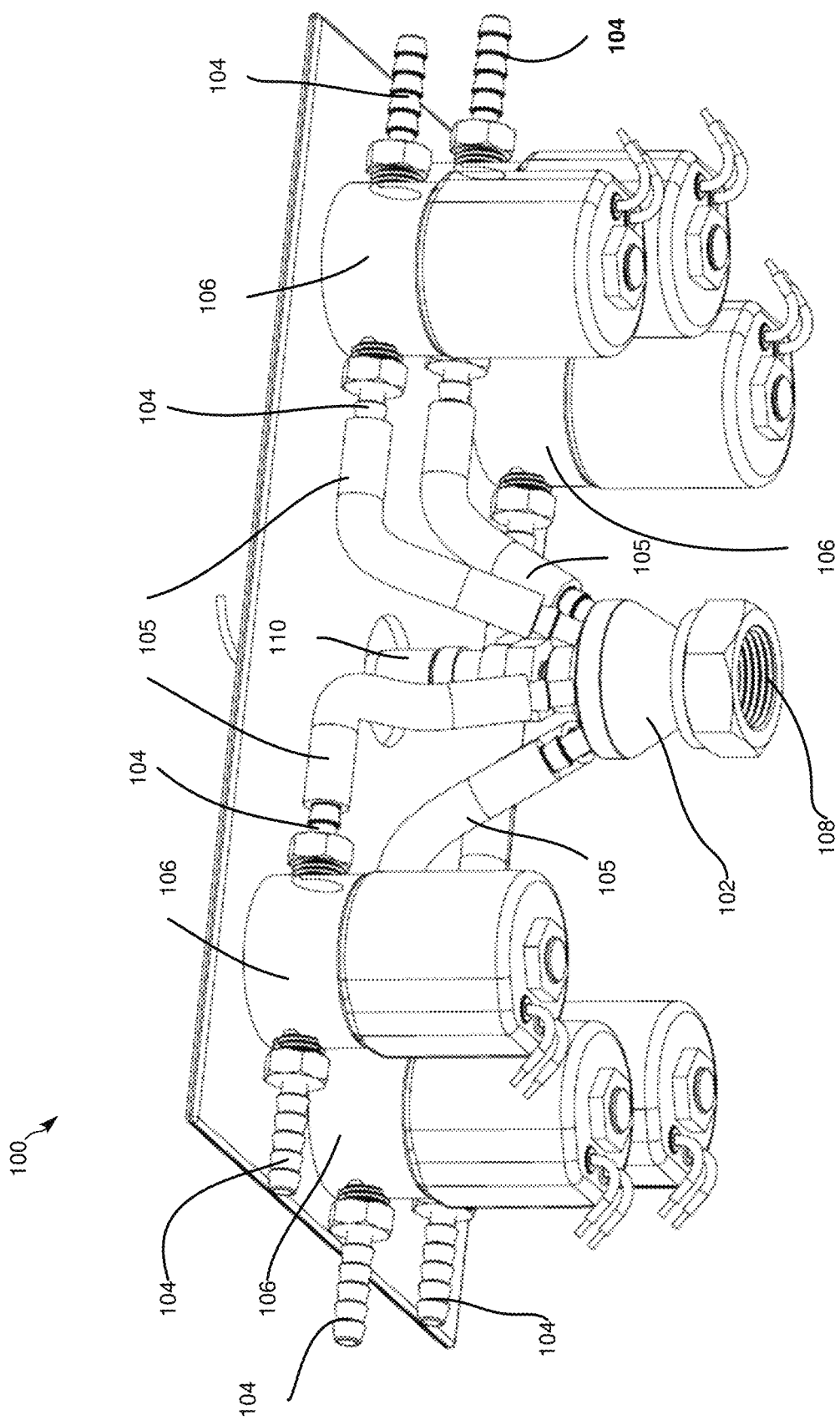
Figure 5C:
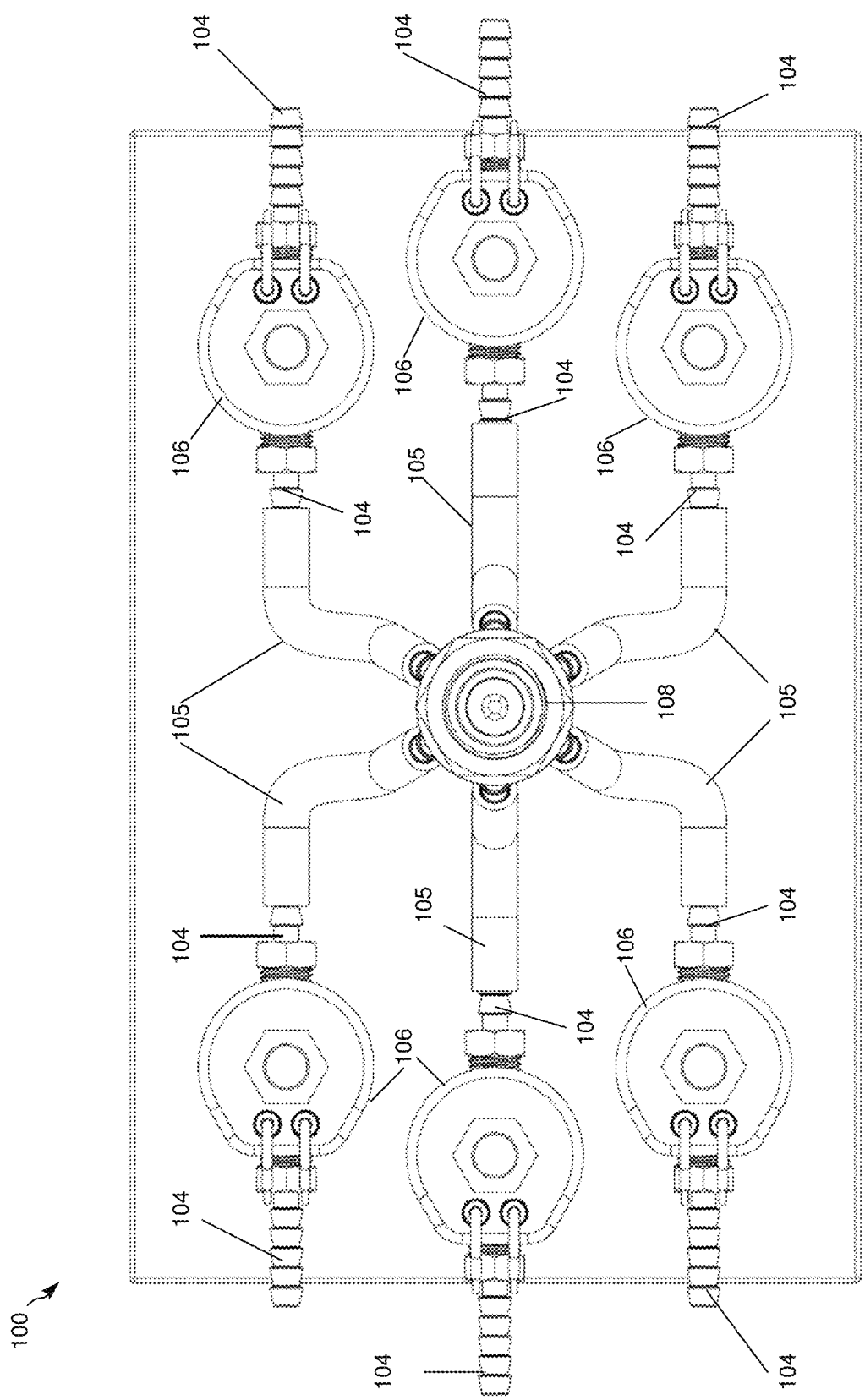
Figure 8:
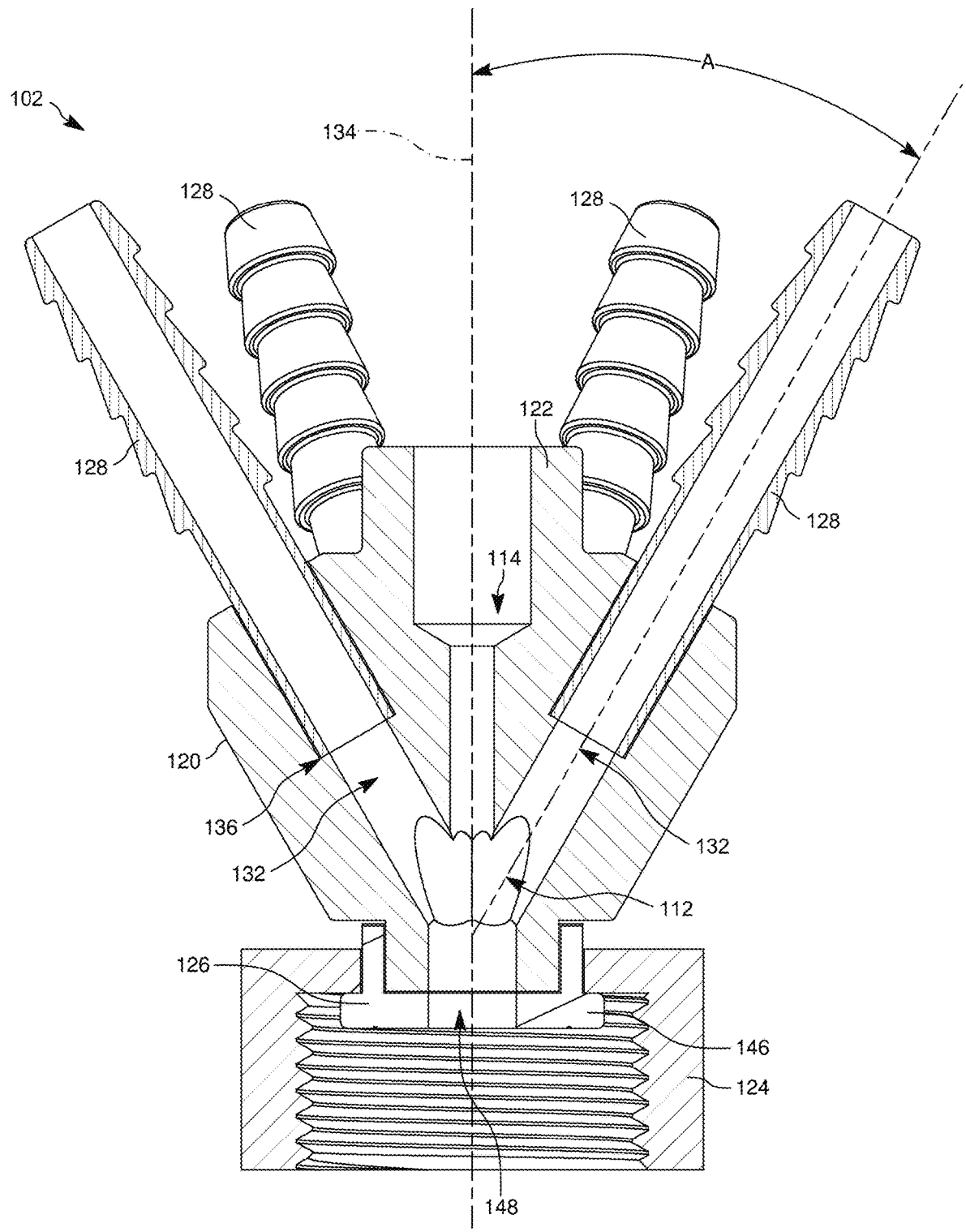
FIG. 8 is a cross-sectional side view of the integrating manifold of FIG. 6.
Figure 9:
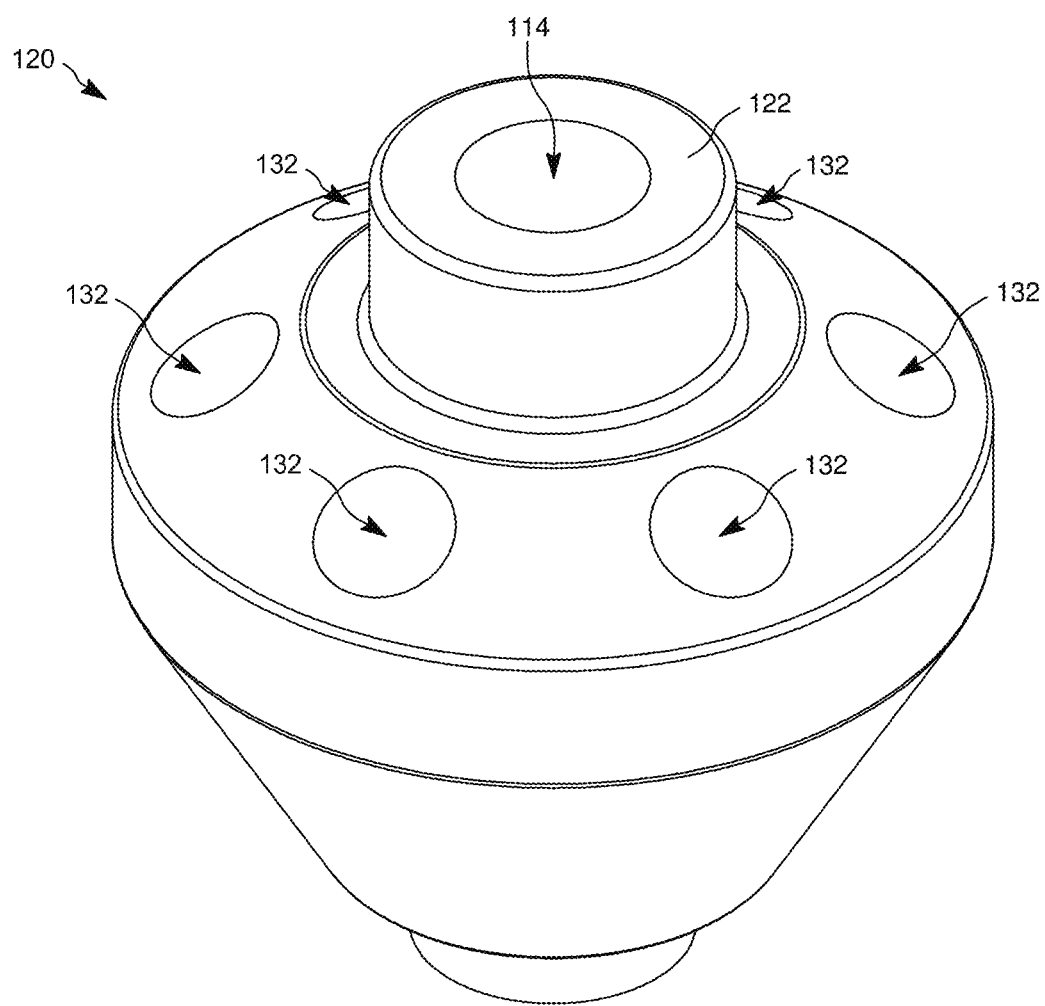
FIG. 9 is a top perspective view of the body of the integrating manifold of FIG. 6.
Figure 10:
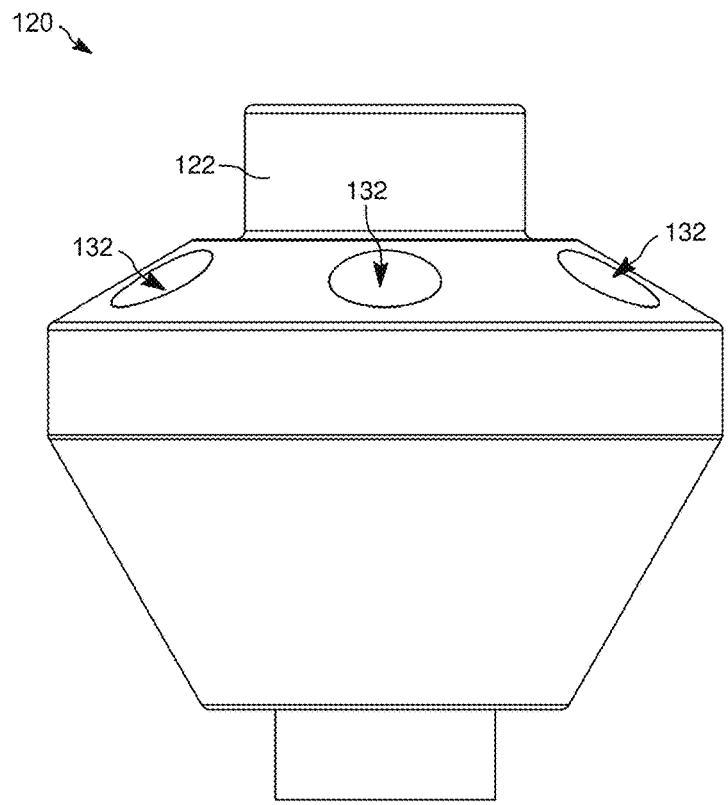
FIG. 10 is a side elevation view of the body of FIG. 9.
Figure 11:
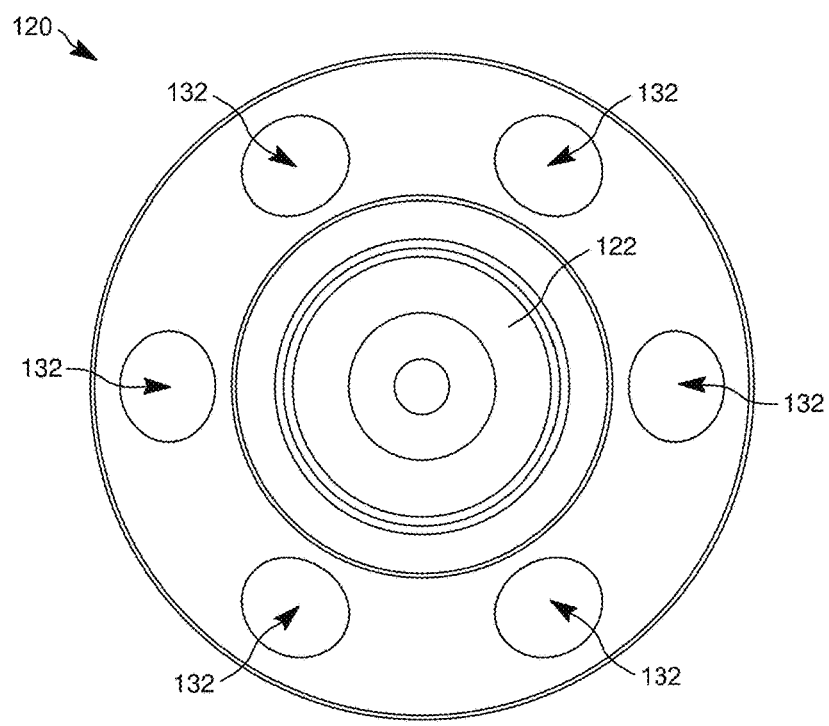
FIG. 11 is a top plan view of the body of FIG. 9.

In addition, the sensing and control of the integrating assembly 100 can be different from that previously described with respect to integrating assembly 20. In this example, with reference to FIG. 1 and as shown in FIG. 5, the input fluid lines 66 extend from input fluid tanks t1 to tn (see, e.g., FIG. 1) and are connected, respectively, to the inlet side barb connectors 104 of the valves 106. Secondary fluid lines 105 connected to the outlet side barbs 104 of the valves 106 extend between and fluidly couple the valves 106 to the integrating manifold 102. This example integrating assembly 100 does not include the flow sensors 62 previously described. Instead, the volumetric flow of input fluid is monitored by the pressure sensor 110 that is fluidly connected to an integrating chamber 112 by a pressure channel 114 (FIG. 8). Rather than controlling the opening/closing of the valves 106 in response to a signal received from flow sensors, the integrating assembly 100, in this example, can control the opening/closing of the valves 106 in response to a signal received from the pressure sensor 110. The pressure sensor 110 and/or the integrating controller 22 can determine a pressure of the fluid in the integrating chamber 112 of the integrating manifold 102. As pressure is directly related to volumetric flow through a dispensing system, the pressure of the fluid in the integrating chamber of known geometric properties may be used to calculate or predict volumetric flow from/through each of the input fluid lines 66. The integrating controller 22, for example, can use pulse width modulation to cause the open/closed pulsing of each valve 106 in response to the monitored pressure of the fluid in the integrating chamber 112. The pressure sensor 110 can be any suitable pressure sensor such as a piezoelectric pressure sensor, an inductive pressure sensor, a capacitive pressure sensor, a strain gauge pressure sensor or the like.

In other examples, the integrating assembly 100 may include one or more flow sensors in combination with the pressure sensor 110. In such examples, a flow sensor may be provided in fluid communication with each input fluid line 66 such that the volumetric flow of the fluid in the input fluid line can be determined and/or communicated to the integrating controller 22. In still other examples, the integrating assembly 100 may include flow sensors instead of the pressure sensor 110. In such examples, the flow sensors can be positioned in fluid communication with the fluid lines 66 as previously described with respect to integrating assembly 20.

Figure 6:
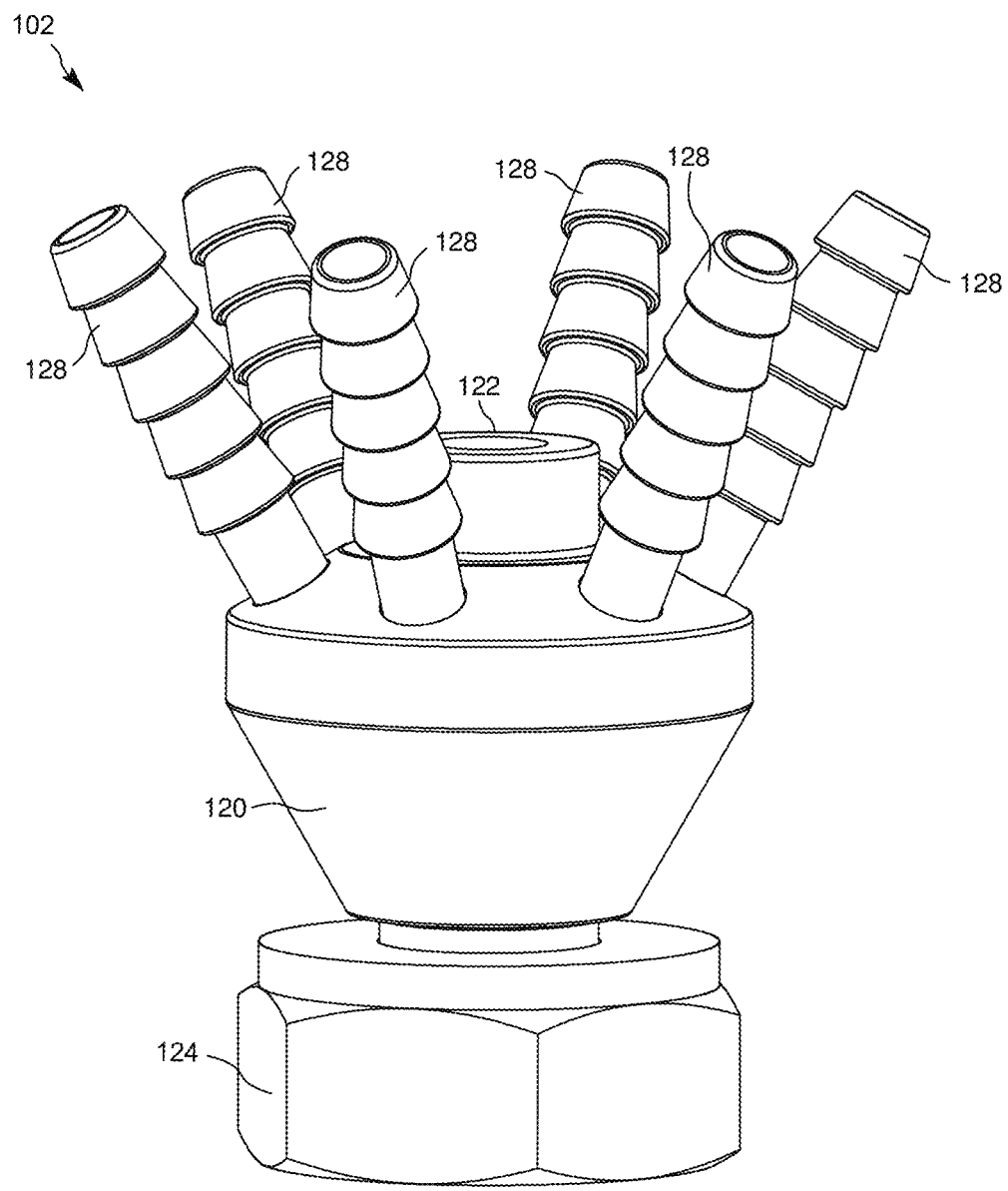
FIG. 6 is a perspective view of an exemplary integrating manifold that can be used in the integrating assembly of FIGS. 5A-6C.
Figure 7:
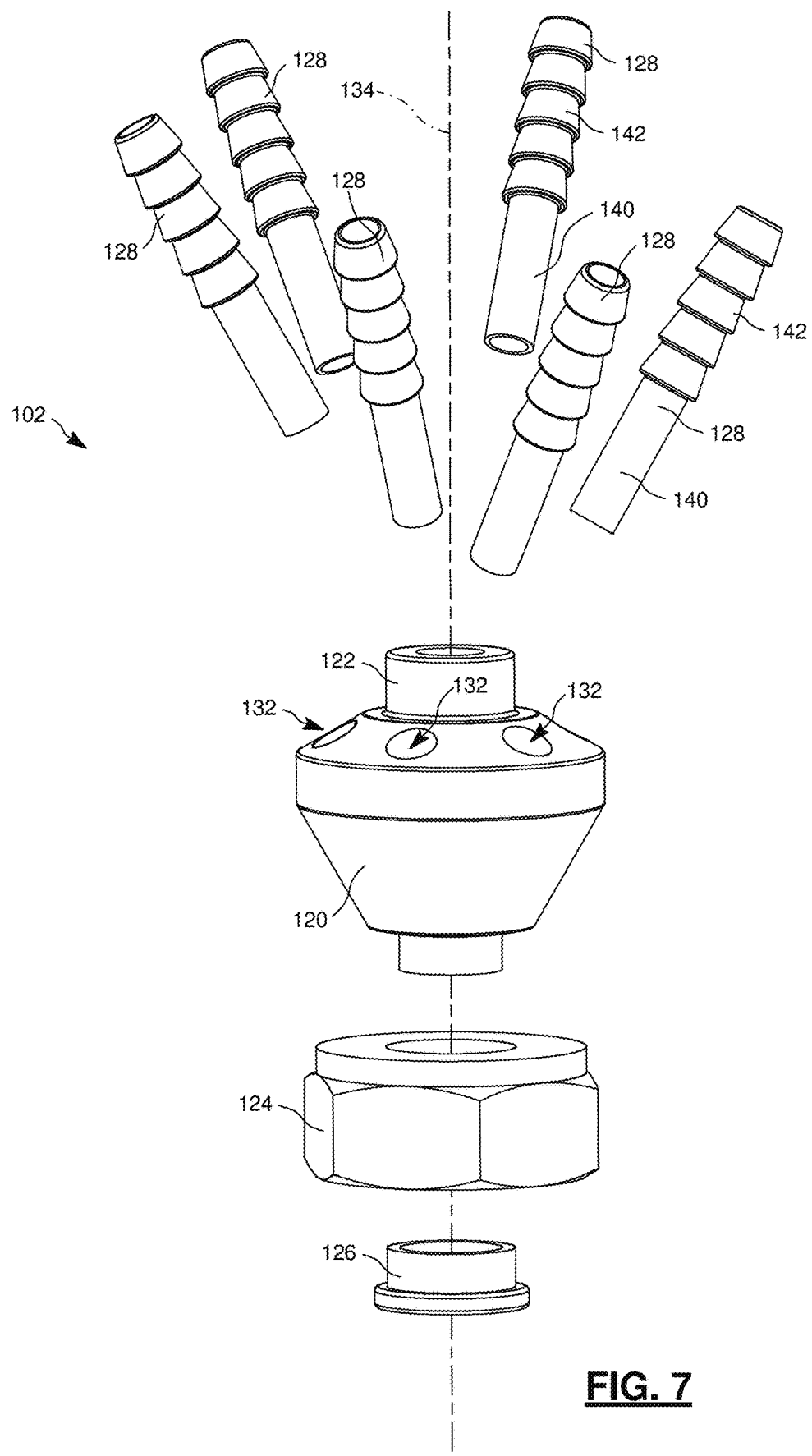
FIG. 7 is an exploded perspective view of the integrating manifold of FIG. 6.

As shown in FIGS. 6, 7 and 8, the integrating manifold 102 can include a body 120, a pressure sensor connector 122, a coupling nut 124, a flange cap 126 and barb fittings 128. The body 120 is the central member of the integrating manifold 102. The pressure sensor connector 122 projects upwards from a top surface of the body 120 and defines the pressure channel 114 (FIG. 8) that extends into the body 120. The pressure sensor connector 122 provides a centralized portion of the body 120 to which the pressure sensor 110 can be connected.

The body 120 can also include input channels 132 that are spaced around the pressure sensor connector 122. In the example shown, the body 120 includes six input channels 132 spaced evenly around the circumference of the body but may include any number "n" of input channels from four to one hundred. As such, in the case of a six channel system, the input channels 132 can be spaced at 60° increments around the body 120 relative to the center axis 134. In other examples, the body 120 can include more or less than six input channels 132 according to the number of input fluids 24 that are used in a particular application. In one example, the number of input channels 132 is greater than or equal to two input channels. In the case of n channels, they may be spaced at 360/n degrees around the body 120 relative to the center axis. In another example, the body 120 can include a quantity of input channels 132 that is between or equal to four to twenty input channels. Still further, unused input channels 132 can be covered and sealed with a suitable plug (not shown) or other sealing member.

Each of the input channels 132 extend inwardly into the body 120 at an angle A (FIG. 8) relative to the center axis 134. In this manner, the input channels 132 converge toward one another and meet at the integrating chamber 112. In this configuration, the integrating chamber 112 is fluidly connected to each input channel 132 and to the pressure channel 114. The pressure of the integrated fluid in the integrating chamber 112 can be monitored by the pressure sensor 110 as each of the input channels 132 variably delivers an input fluid 24 into the integrating chamber 112.

The input channels 132, in the example shown, are oriented at 30° relative to the center axis 134. In other examples, the angle A can have other values that are more or less than 30°. In some examples, the input channels 132 are angled relative to the center axis 134 at an angle A of 10° to 40°. In other examples, the input channels 132 are angled relative to the center axis 134 at an angle A of 5° to 60°. In still other examples, the input channels 132 can be angled relative to the center axis 134 at any angle less than 90°. Still further, the input channels 132 can be oriented at 90° relative to the center axis 134.

The barb fittings 128 can be elongated tubular members that are received into the input channels 132. The barb fittings can include a mating portion 140 (FIG. 7) and a barbed portion 142. The mating portion 140 has an outer diameter that is slightly less than the inner diameter of the input channels 132. In this manner, the mating portion 140 is inserted into the input channel 132 and is seated at a shoulder 136 of the input channel 132 (FIG. 8) at which the inner diameter is reduced to a dimension that is less than the outer diameter of the mating portion 140. As such, the barb fitting 128 remains spaced apart from the integrating chamber 112 when it is fully seated into the input channel 132.

The barbed portion 142 of the barb fitting 128 has one or more frusto-conical shapes that project circumferentially from the outer surface. As can be appreciated, the barbed portion 142 is sized so as to accept a length of plastic or other elastomeric tubing over its outer surface. The barbed portion 142 retains the tubing and creates a sealed joint when the tubing is clamped in position.

The integrating manifold 102 can also include the flange cap 126 and the coupling nut 124. The flanged cap 126 can be secured to a lower portion of the body 120 and includes a flange 146 that retains the coupling nut 124 in position relative to the body 120 and permits the coupling nut 124 to rotate about the center axis 134. The coupling nut 124 can include an internally threaded portion that can permit the integrating manifold to be attached to a dispenser such as a beer tap. The flanged cap 126 includes in internal aperture 148 that is fluidly connected to the integrating chamber 112. In this configuration, integrated fluid can flow from the integrating chamber 112 through the internal aperture 148 and out of an attached dispenser.

The integrating chamber 112 connects the input channels 132 to the single output channel to the internal aperture 148 and is designed to minimize disturbances of the fluids passing through it. When input fluids are supplied sequentially to the chamber though the input channels 132, these fluids flow individually into the chamber and sequentially out the internal aperture 148 with minimized mixing. This design operates to limit mixing and/or to limit the adverse effects on the integrated fluid output, specifically foam production in the example of beer dispensing. Once dispensed into a container, gentle mixing may occur.

To further minimize mixing, turbulence and/or disturbance of the input fluids as the integrated fluid flows into, through and out of the integrating chamber 112, the internal diameters of the various portions of the integrating manifold 102 can be maintained at a constant size. For example, the internal diameters of the input fluid lines 66 and secondary fluid lines 105, the barb fittings 128, the input channels 132 and the integrating chamber 112 can be maintained at a constant diameter. Such a diameter can be coordinated to be the same as an internal diameter of the dispenser (e.g., beer tap) as well.

The previously described elements of the integrating manifold 102 can be machined, cast, molded or otherwise formed of a suitable material. In the example shown, the integrating manifold 102 is machined from 304 stainless steel. As can be appreciated, the properties of the fluid that are being integrated in the integrating manifold 102 can dictate the materials of the integrating manifold 102. In the context of beer and other beverages, stainless steel and food grade plastics can be used.

The barb fittings 128 and the flange cap 126 can be secured to the body 120 of the integrating manifold 102 using any suitable connection method. For example, the barb fittings 128 and the flange cap 126 can be soldered to the body 120 using a silver solder. In other examples, the mating surfaces of the barb fittings 128 and the flange cap 126 can include threaded portions that can be secured to complimentary threaded portions on the body 120. In still other examples, other suitable connection methods including gluing, welding, ultrasonic welding, friction welding, or singular cast, molded, forged, or formed elements can be used.

The integrating manifold 102 (or integrating manifold 30) can be positioned inside or behind a beer tap at a point of sale location. In one example, the integrating manifold 102 can be positioned inside a beer tap or a beer tap box or vessel that is located on a bar top. The integrating manifold 102 can also be positioned in a beer cooler or behind a beer wall that may be located in a refrigerated space. Regardless of the environment, the integrating manifold 102 can be configured so as to minimize the distance between the integrating chamber 112 and the dispenser. The minimization of the distance or the minimization of the volume of integrated fluid between the integrating chamber 112 and the dispenser can assist in reducing the need to purge an integrated fluid from the integrating chamber 112 and/or the dispenser before a subsequent fluid is integrated. As can be appreciated, the volume of integrated fluid that remains in the integrating chamber 112 and/or in the dispenser between integrations can result in an undesirable property in dispensing the next integrated fluid.

Referring back to the FIG. 5, the integrating manifold 102 can be mounted at or near to a dispensing point 152 so as to minimize the volume of integrated fluid that may remain in the integrating chamber 112. The orientation and/or geometry of the integrating chamber 112 can be made such that the volume is further reduced and/or the integrated fluid drains from the integrating chamber 112 and/or the dispenser between fluid integrations.

Figure 12:
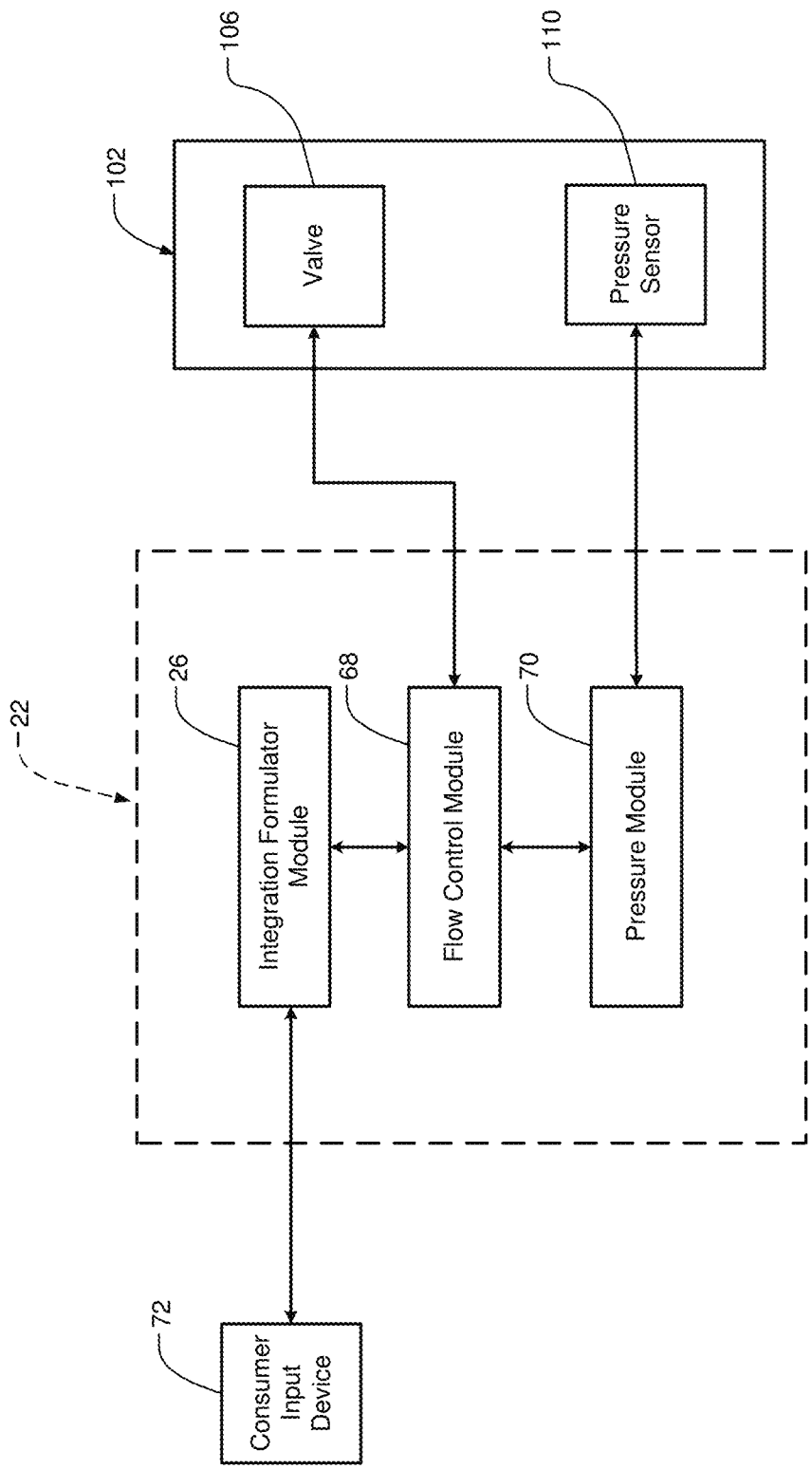
FIG. 12 is a schematic block diagram of an exemplary integrating controller of the present disclosure.

Turning now to FIG. 12, a schematic block diagram of the integrating controller 22 depicts one example in which the integrating controller 22 includes the integration formulator module 26, the flow control module 68 and a pressure module 70. The integrating controller 22 can be operatively coupled to the consumer input device 72, and to the valve 106 and the pressure sensor 110 of the integrating manifold 102. The integration formulator module 26, the flow control module 68 and the pressure module 70 can be operatively coupled to one another. The integrating controller 22 can receive inputs from a consumer (and/or a bartender) and integrate the input fluids to produce the integrated fluid as previously described.

Figure 13:
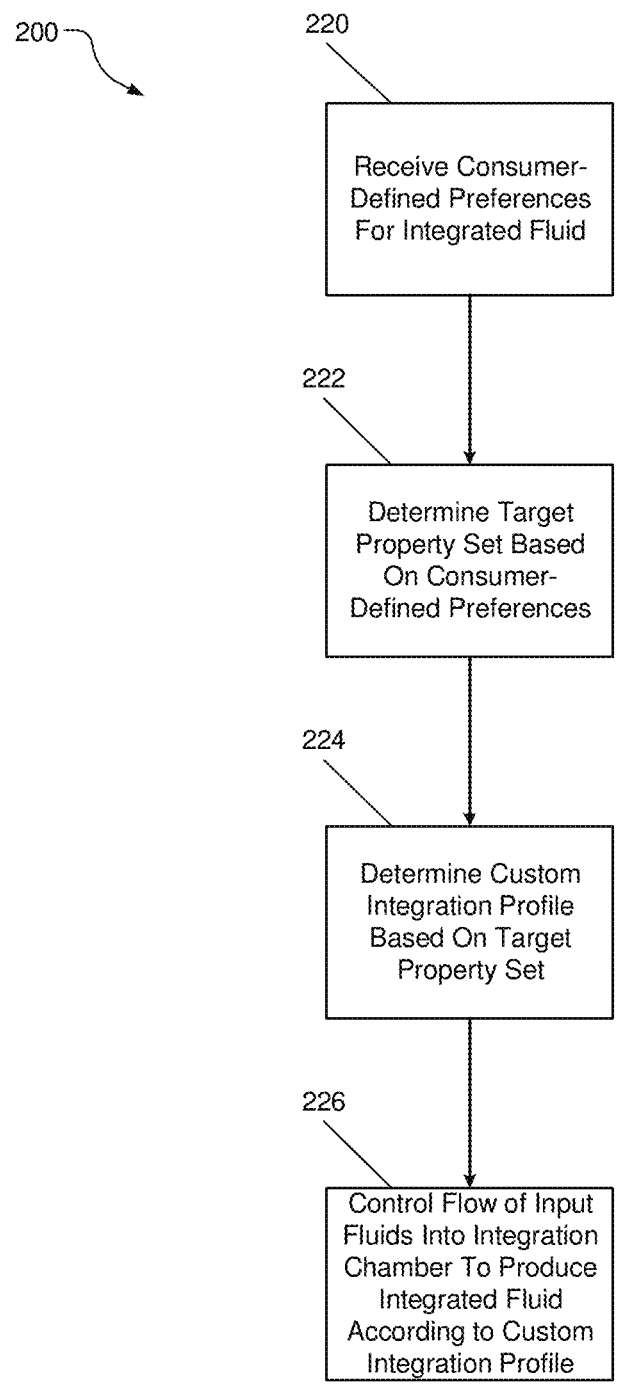
FIG. 13 is a flow chart showing an exemplary method of producing an integrated fluid in accordance with the present disclosure.

One example method 200 of producing an integrated fluid is illustrated in FIG. 13. In the example, the method begins at 220 at which the integrating controller 22 can receive consumer-defined preferences for an integrated fluid. The integration formulator module 26 of the integrating controller 22 can receive the consumer-defined preferences, for example, via the consumer input device 72. The consumer input device 72 can be any suitable input device such as a personal computing device, laptop, kiosk, smartphone, or the like. The consumer input device 72 can include the graphical user interface 40 (FIG. 2) to allow the consumer to select, describe or otherwise specify one or more characteristics of a desired integrated fluid.

At 222, the integration formulator module 26 of the integrating controller 22 can determine a target property set for an integrated fluid based on the consumer-defined preferences. The target property set can be the target property set 48 (FIG. 3) in the previously described example. The target property set includes one or more parameters that can be used to describe the characteristics of a desired integrated fluid.

At 224, the integration formulator module 26 of the integrating controller 22 can determine the custom integration profile of the integrated fluid based on the target property set. The integration formulator module 26 can determine the custom integration profile using any of the previously described methods, including using linear optimization, accessing a look-up table or the like. The custom integration profile can define a volumetric percentage of the two or more input fluids that are fluidly connected to the integrating manifold 102.

At 226, the flow control module 68 and/or the pressure module 70 of the integrating controller 22 can control flow of the input fluids into the integrating chamber 112 of the integrating manifold 102 to produce the integrated fluid according to the custom integration profile. The flow control module 68 can actuate the valves 106 of the integrating manifold 102 as previously described to cause the input fluids to flow into the integrating manifold 102. The input fluids can integrate in the integrating chamber 112 to produce the integrated fluid. The pressure module 70 can be receiving a pressure signal from the pressure sensor 110 that is indicative of the pressure of the fluid in the integrating chamber 112. By monitoring the pressure of the fluid in the integrating chamber and by controlling the opening/closing of the valves 106, the integrating controller 22 can produce the integrated fluid.

Figure 14:
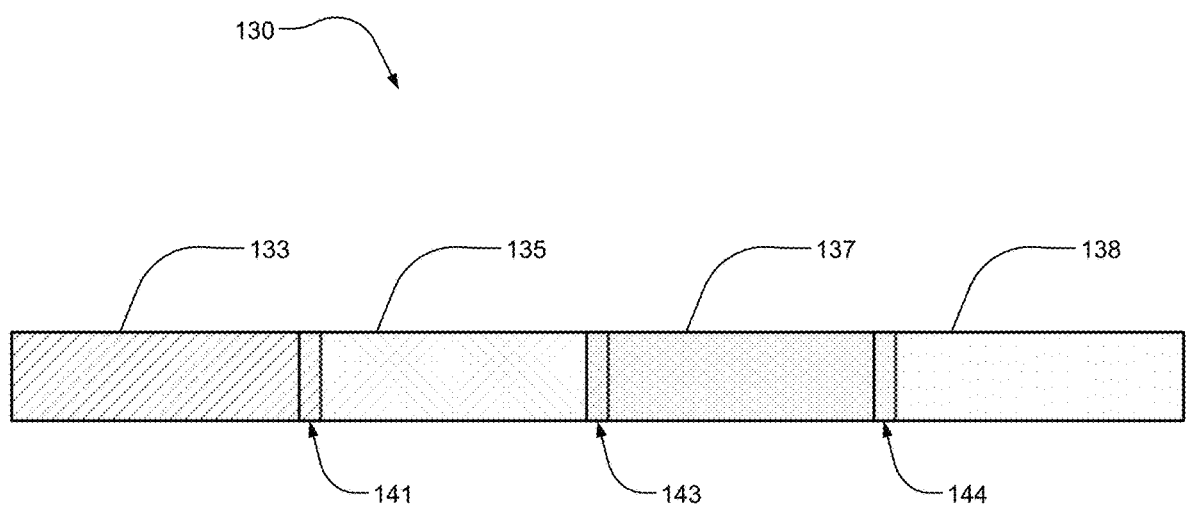
FIG. 14 is an illustration of a portion of an integrated fluid comprised of four input fluids.

As described above, the integrating controller 22 can use pulse width modulation to cause the valves 106 to open and close in a controlled manner to create an integrated fluid 130 (FIG. 14). For purposes of the present disclosure, an integrated fluid is a fluid that includes two or more (and preferably, at least four) different input fluids 24 that are combined in a single volumetric container, such as the integrating chamber 112, without significant mixing such that each input fluid 24 substantially maintains its original properties. As shown in FIG. 14, such an integrated fluid 130 can include a first input fluid pulse 133, a second input fluid pulse 135, a third input fluid pulse 137 and a fourth input fluid pulse 138.

In the example shown, each input fluid 133, 135, 137 and 138 have been dispensed into a single continuous stream of fluid but each input fluid is positioned contiguous to another input fluid without significant mixing. Some overlap of the contiguous input fluids may be desired or may occur during the integrating process by overlapping the opening/closing of the valves 106 or by residual fluids that may flow into the integrating chamber 112. In the example shown, the integrated fluid 130 includes a first overlapping portion 141, a second overlapping portion 143 and a third overlapping portion 144. The overlapping portions 141, 143, 144 can be minimized or limited in order that the volume of fluids in the overlapping portions 141, 143, 144 is less than the volume of fluid in the first input fluid pulse 133, the second input fluid pulse 135, the third input fluid pulse 137 and the fourth input fluid pulse 138.

As can be appreciated, the integrating controller 22 can control the valves 106 to create the integrated fluid 130 by repeated pulsing of the valves 106 to reproduce the integrated fluid 130 as shown to integrate a fluid with any volume as desired. The integrating controller 22 can reproduce the desired integrated fluid 130 at any suitable frequency and in one example, the integrated fluid 130 is reproduced at a frequency of greater than 1/2 Hz. For example, each of the first input fluid pulse 133, the second input fluid pulse 135, the third input fluid pulse 137 and the fourth input fluid pulse 138 can initiate dispensing in less than 5 ms. In another example, each of the first input fluid pulse 133, the second input fluid pulse 135, the third input fluid pulse 137 and the fourth input fluid pulse 138 can be initiate dispensing in less than 3 ms. In still another example, each of the first input fluid pulse 133, the second input fluid pulse 135, the third input fluid pulse 137 and the fourth input fluid pulse 138 can be initiate dispensing in less than 2 ms.

The integrating controller 22 can cause the integrated fluid 130 to be defined in a pulsed manner as previously described in order to minimize and/or prevent mixing, turbulence or other undesirable flow of the input fluids 24 that can result in the release of $CO_2$ that can be contained in a carbonated input fluid 24 such as beer or alcoholic cider. Such release of $CO_2$ can result in undesirable foam to accumulate in the system.

Figure 15:
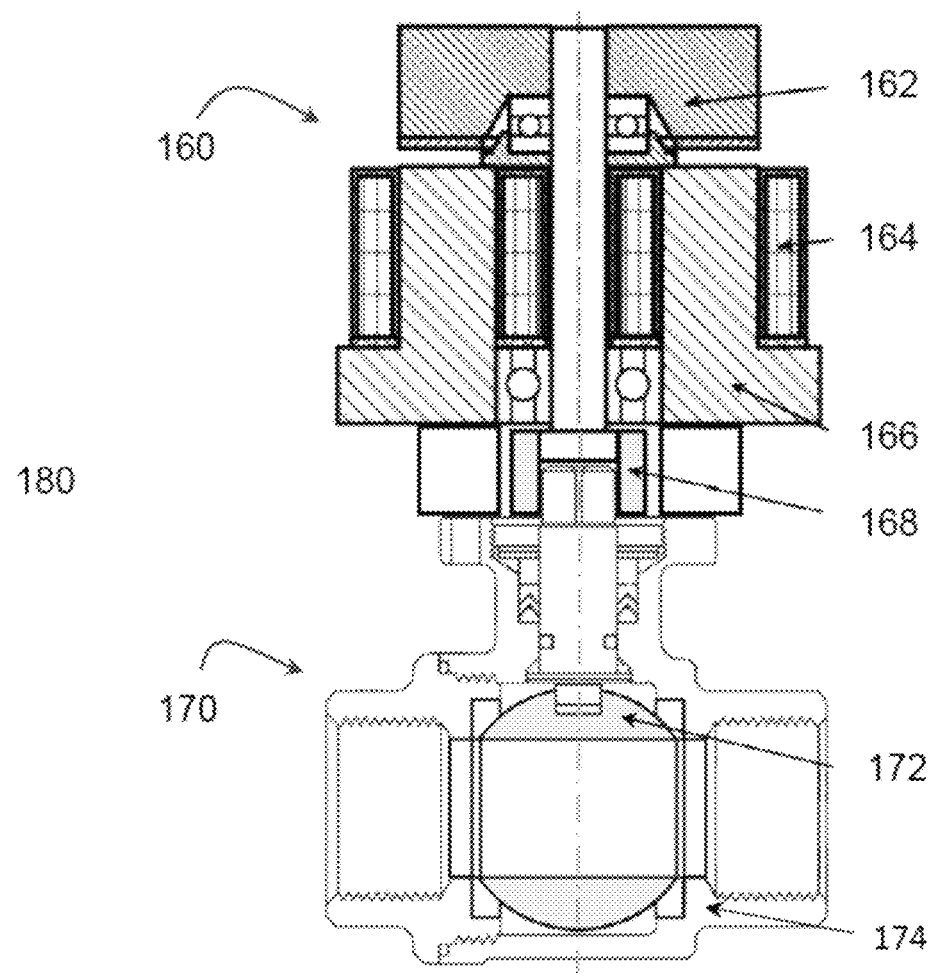
FIG. 15 shows a rotary solenoid ball valve suitable for use in the integrating assembly of the present disclosure.

In another example (FIG. 15), a rotary solenoid ball valve 180 is used for the solenoid valve 106 to reduce turbulence in the input fluids 24. The ball valve 170 is rotated through 90 degrees by the rotary solenoid 160 through the coupling 168. In the example shown, the rotary solenoid uses a winding 164 to generate a magnetic field in the core 166 to produce a torque on the armature 162 to move the valve's ball 172 quickly 90 degrees to align the balls opening and open the valve. When the field is changed, the valve returns to a zero degrees where the balls opening is blocked by the valve body 174. When aligned, the ball valve has an opening that is similar to the connected tube and minimizes undesirable local fluid pressure and velocity changes within the valve.

After the method 200 has completed, the integrated fluid can be dispensed into a suitable vessel and can be provided to the consumer. As can be appreciated, the method 200 can be repeated to repeatedly produce integrated fluids having different characteristics or properties to suit the tastes and preferences of individual and varying consumers.

The method 200 can include other steps that are suitable for a commercial environment such as a bar, restaurant, brewery or other consumer or industrial fluid dispensing location. For example, if the integrating controller 22 can determine a volume of the integrated fluid that is dispensed from the integrating assembly, such determination can be used to calculate a cost associated with the dispensed integrated fluid.

In one example, the integrating controller 22 can be used to make one or more of the calculations described below. In other examples, the calculations can be made by other processing devices that can be in communication with the integrating controller 22. As discussed above, a beer or alcoholic cider dispensing system such as the integrating assembly 20 can be designed such that the pressure at the volume of an input fluid 24 (such as at a keg of beer or alcoholic cider) is fully dissipated by the fluid frictional losses between the keg and the dispenser (e.g., the tap). Two inputs that can be used to design balanced system include the pressure at the keg and the diameter of the fluid input line 66. The computation of a balanced system starts with Bernoulli's equation that describes the relationship between pressures and flows between two points in a tube or pipe system: point 1 upstream and point 2 downstream.

$$\underbrace{\frac{P_1}{\gamma} + z_1 + \frac{v_1^2}{2g}}_{\substack{\text{Total energy per} \\ \text{weight of fluid} \\ \text{at upstream point}}} = \underbrace{\frac{P_2}{\gamma} + z_2 + \frac{v_2^2}{2g}}_{\substack{\text{Total energy per} \\ \text{weight of fluid} \\ \text{at downstream point}}} + \underbrace{f \frac{L}{D} \frac{v^2}{2g}}_{\substack{\text{Energy lose} \\ \text{between upstream} \\ \text{and downstream points}}}$$

Rearranging Bernoulli's equation for flow in a "balanced system", the length of keg-to-tap tubing can be computed as $$L = \left[ \underbrace{\frac{\Delta P}{\gamma}}_{\substack{\text{Pressure in Keg} \\ \text{over specific} \\ \text{weight of beer}}} - \underbrace{z_2}_{\substack{\text{distance from} \\ \text{center of keg} \\ \text{to tap}}} \right] \frac{\overbrace{D}^{\substack{\text{Tubing} \\ \text{diameter}}}}{\underbrace{f}_{\substack{\text{friction} \\ \text{factor}}}} \underbrace{\frac{2g}{v^2}}_{\substack{\text{Kinetic Energy} \\ \text{(determind from} \\ \text{desired Bow)}}}$$

Showing (US or metric) compatible units, $\Delta P = P_1 - P_2$ is the pressure in the keg (lbf/ft² or Pa=N/m²), y is the specific weight of the beer (lbf/ft³ or N/m³), $z_2$ is the distance from a center of the keg to the tap outlet (ft or m), D is the diameter of the tube (ft or m), $f$ is the pipe flow friction factor, g is the acceleration of gravity (ft/sect or m/sec²) and v is the beer fluid velocity in the tube.

For a fixed length L and various flowrates Q, the above equation can be rearranged to compute the associated keg pressure $$\Delta P = \gamma\left(z + f\frac{L}{D}\frac{v^2}{2g}\right) = \gamma\left[z + 8\frac{fLQ^2}{g\pi^2 D^5}\right]$$

Where the friction factor $$f = \frac{h}{\left[\frac{L}{D}\right]\left[\frac{u^2}{2g}\right]}(ND)$$

is a non-dimensional ratio between tube h head loss (ft or m), and the dynamic velocity head (ft or m) in the tube. Dynamic head in the denominator is a function of L tube length (ft or m), D tube inside diameter of the pipe (ft or m), u fluid flow velocity (ft/sec or m/sec), and g the acceleration due to gravity (32.2 ft/sec² or 9.81 m/sec²). Friction Factor is a measured parameter that is dependent on the tube flow's non-dimensional surface roughness e/D and non-dimensional flow velocity known as the Reynold's number $$Re = \frac{\rho u D}{\mu} = \frac{uD}{v} = \frac{QD}{vA}$$

Any of the three right-hand side representations for Reynold's number can be used. The parameters in the three equivalent forms include ρ mass density of the fluid ((lbm/ft³) or kg/m³), μ fluid dynamic viscosity (lbf-sec/ft² or N-s/m²), v=μ/ρ fluid kinematic viscosity (ft²/sec or m²/sec), u=Q/A, fluid average velocity (m/s or ft/s), D tube inside diameter (m or ft), Q fluid volumetric flowrate (m³/sec or ft³/sec), and A tube cross-sectional area (m² or ft²).

Graphs of the measured friction factor vs. Reynold's number and non-dimensional roughness are available via references materials or other sources. Reading such a graph can be difficult, however, reasonable fits to the measured results are available. One well-accepted fit for Friction factor (ND), is the Swamee-Jain Darcy equation $$f = \frac{0.25}{\left[\log\left(\frac{c/D}{3.7} + \frac{5.74}{Re^{0.3}}\right)\right]^2}$$

Figure 16:
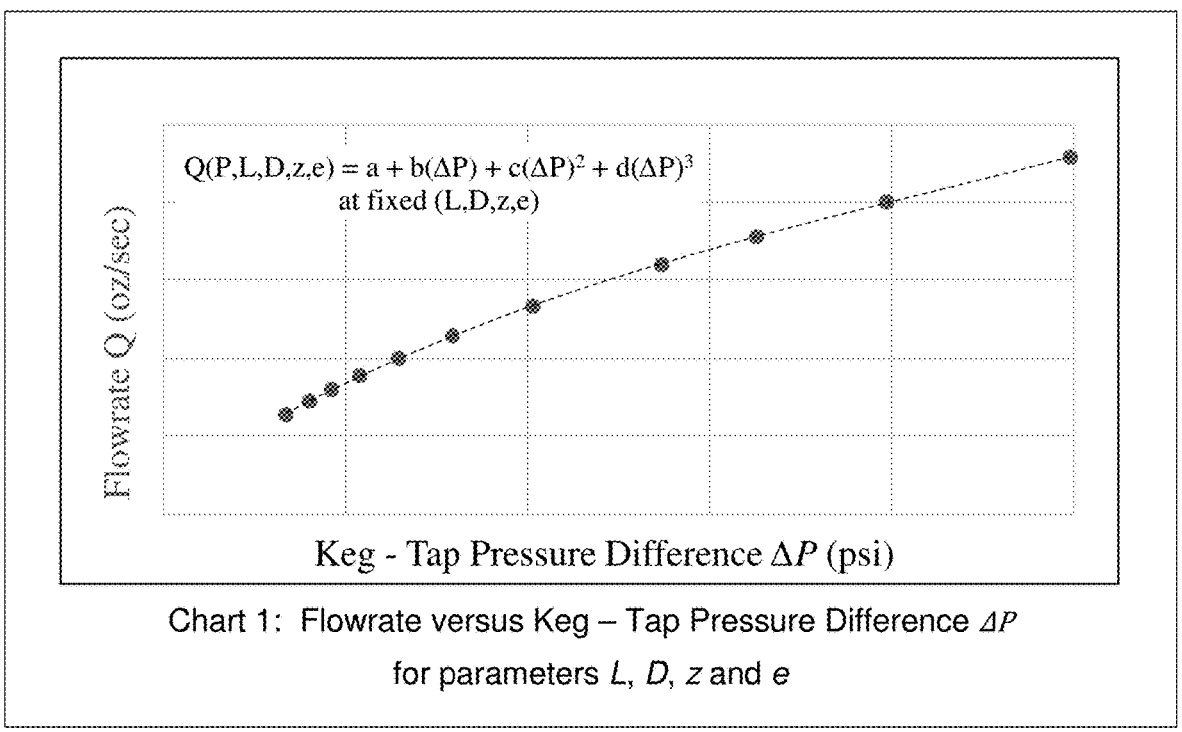
FIG. 16 shows an exemplary plot of Q(n) versus ΔP(n).

Because the friction factor $f = f(v, e)$ is a non-linear function of roughness and velocity, it is not possible to find a general result for velocity v or flowrate Q as a function of pressure change ΔP and tube length L. Instead, for a specific length L, roughness e, diameter D, and n values of velocity v(n)=Q(n)/A, corresponding values of ΔP(n)=ΔP(L,D,z,e,v(n)) can be calculated. These specific pairs of values can then be used to plot Q(n) versus ΔP(n) for a specific device's parameters. See FIG. 16.

Once n pairs of Q vs ΔP are plotted in the most useful physical units (psi to oz/sec), a best fit polynomial function to the data points is calculated. For this system, a third order polynomial (dotted) line provides an accurate value for flowrate Q(oz/sec) at a given pressure P (psi). A polynomial fit and the sensed pressure drop P allows measurement of the dispensing flowrate $$Q(\text{oz/sec}) = a + b(\Delta P) + c(\Delta P)^2 + d(\Delta P)^3$$

where a, b, c and d are $3^{rd}$ order polynomial fit coefficients. The total dispense time is also measured and allows the calculation of total volume dispensed by the device $$V(\text{oz}) = T(\text{sec}) * Q(\text{oz/sec})$$

where T (sec) is the measured dispense time.

The above methodology can be used to determine a volume of integrated fluid dispensed from the fluid integrating systems 10 of the present disclosure. With a known volume, a cost can be also be computed based on the cost of the associated input fluids 24 that are dispensed from the fluid integrating system 10.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements.

As used herein, the phrase at least one of A, B, and C should be construed to mean a logical (A OR B OR C), using a non-exclusive logical OR, and should not be construed to mean "at least one of A, at least one of B, and at least one of C." The term subset does not necessarily require a proper subset. In other words, a first subset of a first set may be coextensive with (equal to) the first set.

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or integrated analog/digital discrete circuit; a digital, analog, or integrated analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

Some or all hardware features of a module may be defined using a language for hardware description, such as IEEE Standard 1364-2005 (commonly called "Verilog") and IEEE Standard 1076-2008 (commonly called "VHDL"). The hardware description language may be used to manufacture and/or program a hardware circuit. In some implementations, some or all features of a module may be defined by a language, such as IEEE 1666-2005 (commonly called "SystemC"), that encompasses both code, as described below, and hardware description.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A fluid integrating system for producing a target fluid having characteristics according to specific user-defined preferences, the fluid integrating system comprising:

an integrating assembly including a plurality of fluid lines, a plurality of valves, and a manifold, the manifold including (i) a body having a plurality of input fluid inlets, the fluid inlets disposed at respective angles relative to a center axis extending through the manifold and the fluid inlets extending into the body and intersecting to define an integrating chamber within the body of the manifold, and (ii) a pressure channel in fluid communication with the integrating chamber; and an integrating controller configured to (i) receive a custom integration profile and (ii) selectively control flows of a plurality of fluids through respective ones of the plurality of fluid lines and the plurality of valves into the integrating chamber of the manifold to dispense the target fluid based on the custom integration profile, wherein dispensing the target fluid includes dispensing an integrated fluid stream having discrete longitudinal flows of the plurality of fluids.

2. The fluid integrating system of claim 1, wherein the target fluid includes at least one alcoholic beverage.

3. The fluid integrating system of claim 2, wherein the at least one alcoholic beverage includes one of beer and cider.

4. The fluid integrating system of claim 2, wherein the at least one alcoholic beverage has an alcohol by volume between 2 and 15 percent.

5. The fluid integrating system of claim 1, wherein the target fluid includes two or more different carbonated fluids.

6. The fluid integrating system of claim 1, wherein the discrete longitudinal flows are substantially unmixed in the integrated fluid stream.

7. The fluid integrating system of claim 1, wherein the integrating assembly is arranged to provide respective fluids from the plurality of fluid lines via a single dispenser.

8. The fluid integrating system of claim 7, wherein a distance between the manifold and the dispenser is less than 10 inches.

9. The fluid integrating system of claim 1, wherein the plurality of valves includes at least one rotatory solenoid valve.

10. The fluid integrating system of claim 1, wherein the integrating assembly further comprises at least one of (i) a pressure sensor in fluid communication with the pressure channel and (ii) a fluid flow sensor in fluid communication with each of the fluid lines.

11. The fluid integrating system of claim 10, wherein two or more of the plurality of fluid lines, the input fluid inlets, the manifold, and the pressure channel have a same inner diameter.

12. The fluid integrating system of claim 1, wherein the integrating controller is configured to at least one of (i) open and close each of the plurality of valves in accordance with at least one of time modulation control and pulse width modulation control and (ii) open and close each of the plurality of valves sequentially.

13. The fluid integrating system of claim 1, further comprising:
a user input device configured to receive the user-defined preferences; and
an integration formulator in communication with the integrating controller and configured to calculate the custom integration profile of the target fluid based on the user-defined preferences.

14. The fluid integrating system of claim 13, further comprising a computing device configured to execute software to capture the user-defined preferences for the target fluid and convert the user-defined preferences to the custom integration profile.

15. The fluid integrating system of claim 14, wherein the computing device comprises a conversational translator configured to accept spoken-language user inputs descriptive of the user-defined preferences.

16. The fluid integrating system of claim 15, wherein the conversational translator is configured to convert the spoken-language user inputs to a quantitative property set for the target fluid.

17. The fluid integrating system of claim 1, further comprising an integration formulator configured to:
calculate a target property set for the target fluid based on the user-defined preferences, the target property set including one or more parameters describing the characteristics of the target fluid, and
calculate the custom integration profile of the target fluid based on the target property set.

18. The fluid integrating system of claim 17, wherein the target property set corresponds to a normalized property set of the user-defined preferences.

19. The fluid integrating system of claim 1 further comprising:
an integration formulator in communication with the integrating controller; and
a user input device in communication with the integration formulator and the integrating controller, the user input device comprising a computing device configured to execute software to capture the user-defined preferences for the target fluid and convert the user-defined preferences to a characteristic profile indicative of the user-defined preferences for the target fluid;
wherein the integrating controller is coupled to the integrating assembly via a computer network;
wherein the integrating assembly further comprises at least one of a pressure sensor in fluid communication with the pressure channel and a fluid flow sensor in fluid communication with each of the plurality of fluid lines;
wherein the integrating controller is in communication with the at least one of the pressure sensor and the fluid flow sensor and is configured to
determine at least one of a sensed pressure in the manifold and a sensed fluid flow rate in each of the plurality of fluid lines, and
wherein the integration formulator configured to receive the characteristic profile indicative of the user-defined preferences from the user input device, calculate a target property set for the target fluid based on the user-defined preferences, the target property set including one or more parameters describing the characteristics of the target fluid, and calculate the custom integration profile of the target fluid based on the target property set; and
wherein the integrating controller is configured to individually control the opening and closing of each of the plurality of valves based on the custom integration profile.

* * * * *